United States Patent
Sager et al.

(10) Patent No.: US 11,931,731 B2
(45) Date of Patent: Mar. 19, 2024

(54) COATED TIP CUP

(71) Applicant: TECAN TRADING AG, Mannedorf (CH)

(72) Inventors: Adrian Sager, Mannedorf (CH); Philipp Ott, Steg (CH); Sara Ferdi, Zurich (CH)

(73) Assignee: TECAN TRADING AG, Mannedorf (CH)

( * ) Notice: Subject to any disclaimer, the term of this patent is extended or adjusted under 35 U.S.C. 154(b) by 420 days.

(21) Appl. No.: 17/312,162

(22) PCT Filed: Dec. 20, 2019

(86) PCT No.: PCT/EP2019/086569
§ 371 (c)(1),
(2) Date: Jun. 9, 2021

(87) PCT Pub. No.: WO2020/127902
PCT Pub. Date: Jun. 25, 2020

(65) Prior Publication Data
US 2022/0016619 A1    Jan. 20, 2022

(30) Foreign Application Priority Data

Dec. 20, 2018 (WO) ................ PCT/US2018/066850
Dec. 20, 2018 (WO) ................ PCT/US2018/066857

(51) Int. Cl.
*B01L 3/02* (2006.01)
*B03C 1/01* (2006.01)
(Continued)

(52) U.S. Cl.
CPC .......... *B01L 3/0275* (2013.01); *B01L 3/0279* (2013.01); *B03C 1/01* (2013.01); *B03C 1/32* (2013.01);
(Continued)

(58) Field of Classification Search
CPC ................ B01L 3/0275; B01L 3/0217; B01L 2200/026; G01N 35/10; G01N 2035/103
See application file for complete search history.

(56) References Cited

U.S. PATENT DOCUMENTS

| 6,117,394 | A | * | 9/2000 | Smith | ............... | B01L 3/0275 |
| | | | | | | 73/864.03 |
| 6,436,349 | B1 | * | 8/2002 | Carey | ............... | G01N 35/021 |
| | | | | | | 422/549 |
| 2008/0063573 | A1 | * | 3/2008 | Ammann | ............... | B01L 7/52 |
| | | | | | | 422/105 |

FOREIGN PATENT DOCUMENTS

| EP | 0834729 A2 | 4/1998 |
| EP | 0843176 A1 | 5/1998 |
| WO | 2014/140640 A1 | 9/2014 |

OTHER PUBLICATIONS

International Search Report and Written Opinion for corresponding PCT application No. PCT/EP2019/086569, dated Apr. 7, 2020.

* cited by examiner

*Primary Examiner* — David Z Huang
(74) *Attorney, Agent, or Firm* — Notaro, Michalos & Zaccaria P.C.

(57) ABSTRACT

A pipette tip extension attachable to a pipette tip is disclosed. The pipette tip extension has a proximal end, a distal end, and an exterior wall extending between the proximal end and the distal end. The exterior wall has an outer side and an inner side and forms at the proximal end a reception aperture for inserting a pipette tip. The pipette tip extension further has a bottom at the distal end, an inner cavity enclosed by the inner side of the exterior wall and the bottom, one or more distance elements arranged at the inner side of the (Continued)

exterior wall and protruding into the inner cavity, and a coating for interacting with a fluid present in a fluid uptake area.

22 Claims, 9 Drawing Sheets

(51) Int. Cl.
  *B03C 1/32* (2006.01)
  *G01N 35/10* (2006.01)
(52) U.S. Cl.
  CPC ............ *G01N 35/10* (2013.01); *B01L 3/0217* (2013.01); *B01L 2200/023* (2013.01); *B01L 2200/025* (2013.01); *B01L 2200/026* (2013.01); *B01L 2300/0832* (2013.01); *B01L 2300/0858* (2013.01); *B01L 2300/18* (2013.01); *B01L 2400/0478* (2013.01); *G01N 2035/103* (2013.01)

Fig. 2A
Fig. 2B
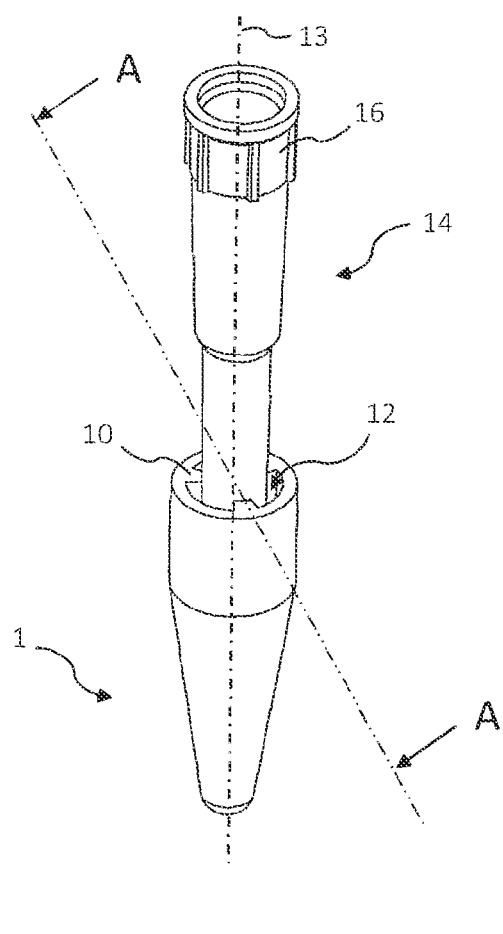
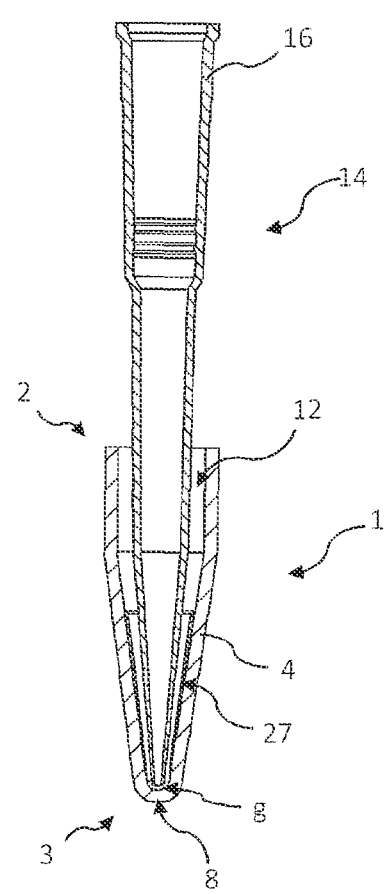

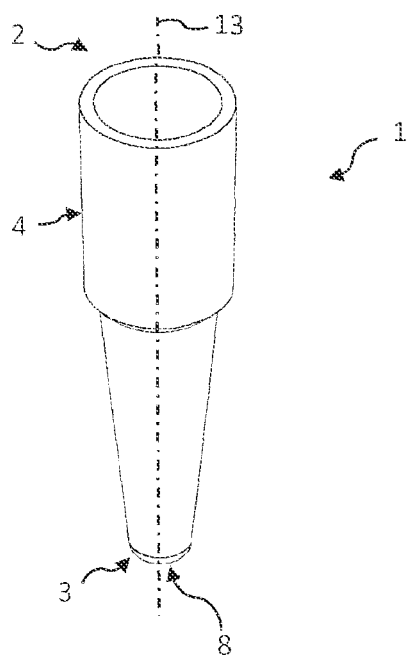
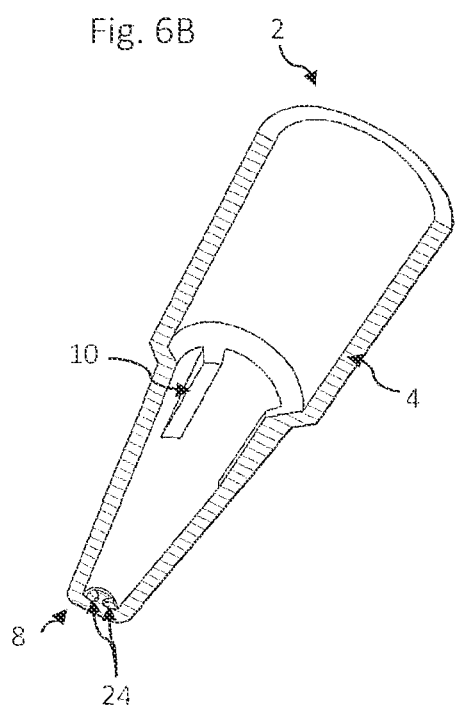
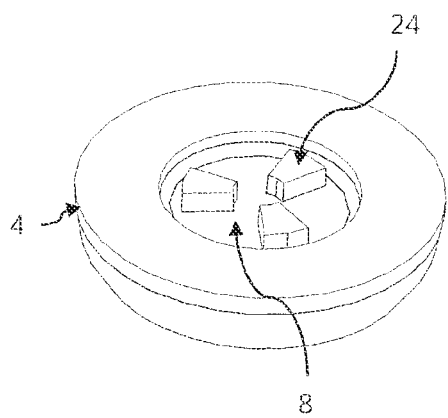

COATED TIP CUP

TECHNICAL FIELD OF THE INVENTION

The current invention relates to a pipette tip extension which is attachable to a pipette tip. The current invention further relates to an assembly comprising a pipette tip and a pipette tip extension, and to a method of treating a sample in a liquid by using the pipette tip extension. The present invention claims the priority of the international patent application No. PCT/US18/66850, and of the international patent application No. PCT/US18/66857, both having been filed on Dec. 20, 2018.

DESCRIPTION OF THE RELATED ART

In the field of liquid handling, a number of different liquid handling tubes are used. In particular in the handling of liquids with biological material, the tubes are plastic tubes for single use, as they help in reducing the risk of contaminating such biological material. Such liquid handling tubes are usually configured to be closed by laboratory staff working on a laboratory bench, which staff are trained to apply the particular care for avoiding such contaminations. However, the handling of lids or caps is often disadvantageous in liquid handling automation. There have been efforts in automating for example in de- and recapping such liquid handling tubes, however, the solutions are always complicated so that the handling of such tubes in liquid automation remains disadvantageous. There are also solutions in which the tubes are aggregated for example in a specific tube carrier or as so-called microplates, which allow an easier handling by pipetting robots and are therefore automation-friendly. However, such microplates are particularly adapted for high-throughput applications. If individual tubes shall be used in automation, the processing still is complicated, in particular for example in the context of application development or small-batch-applications.

SUMMARY OF THE INVENTION

It is an object of the present invention to provide an alternative solution for liquid handling which is practicable also in the use of automated liquid handling systems. In particular, it is an objective to provide an alternative liquid handling tube.

This problem is solved by a pipette tip extension which is attachable to a pipette tip, the pipette tip extension having the features of claim 1. Further embodiments of the pipette tip extension as well as an assembly of a pipette tip extension and a method of treating a sample by using the pipette tip extension are defined by the features of further claims.

The pipette tip extension according to the invention is attachable to a pipette tip and comprises a proximal end, a distal end, and an exterior wall extending between the proximal end and the distal end. The exterior wall has an outer side and an inner side and forms at the proximal end a reception aperture for inserting a pipette tip. The pipette tip extension also comprises a bottom at the distal end. An inner cavity is enclosed by the inner side of the exterior wall and the bottom.

The pipette tip extension further comprises one or more distance elements which are arranged at the inner side of the exterior wall and which protrude into the inner cavity. The one or more distance elements are dimensioned to establish a fluid uptake area adjacent to the inner side of the exterior wall and the bottom. Said fluid uptake area extends from the bottom up to the reception aperture and is in fluid connection with the surrounding atmosphere at the reception aperture.

The pipette tip extension according to the invention further comprises a coating facing towards the fluid uptake area.

Thus, the coating is arranged such that it can interact with a fluid present in the fluid uptake area, once a fluid has entered into the fluid uptake area during use of the pipette tip extension.

The proximal end refers in connection with the pipette tip extension to the end of the pipette tip extension which is closest to a reception aperture into which a pipette tip may be inserted. Occasionally, the proximal end might also be addressed to as the upper end of the pipette tip extension. Accordingly, the distal end refers in connection with the pipette tip extension to the end of the pipette tip extension being more distant to the reception aperture for inserting a pipette tip. Thus, the distal end is opposite to the reception aperture, and might also be addressed to as a lower end or bottom end. In connection with a pipette tip, the term proximal end refers to the upper end of the pipette tip which is for use typically attached to a pipette and the associated pipetting channel, while the term distal end refers to the lower end of the pipette tip with an outlet opening for aspirating or dispensing a liquid.

The term "a pipette tip extension attachable/attached to a pipette tip" describes essentially the same situation as the term "a pipette tip insertable/inserted into the pipette tip extension". It is described here that the pipette tip extension is configured to be connectable to a pipette tip. This may be realized in that, in particular, the diameter of reception aperture and the dimension of the inner cavity formed by the exterior wall and the bottom are adapted to the dimensions of a pipette tip which shall be inserted into the pipette tip extension. The dimensions of the reception aperture and the inner cavity allow the uptake of a specific pipette tip, and ensures according to the invention that a gap is formed between the outer wall of the inner pipette tip and the inner wall of the pipette tip extension, into which a fluid or liquid can be moved.

A suitable pipette tip may for example be a disposable pipette tip made of a plastic material, or of a so-called fixed pipette tip, made of a metal.

In the context of the present invention, a disposable pipette tip is a pipette tip which may be taken up and/or ejected for example by a liquid handling device automatically. It may be made of a plastic material, and the connection to the liquid handling device may be realized by slightly deforming the plastic to achieve a friction fit connection between the tip and the device.

In the context of the present invention, a fixed pipette tip may be connected to the liquid handling device mechanically by form fit, for example may be screwed to the device. Mounting and dismounting typically requires a manual interaction. A fixed pipette tip may be made of a metal to ensure a stable shape.

The one or more distance element(s) is/are configured to position an inserted pipette tip at a defined distance to the inner wall of the pipette tip extension, and thereby allows the formation of a fluid uptake area at the inner side of the exterior wall of the pipette tip extension also when a pipette tip is inserted. A distance element thus may prevent that an inserted pipette tip fully abuts the inner side of the exterior wall of the pipette tip extension, or the coating, respectively.

The required or desired position of a pipette tip within the pipette tip extension may depend on the type of reaction or interaction provided by the coating. For example, a pipette tip may be asymmetrically arranged within the pipette tip extension, so that the fluid uptake area is particularly established mainly on one side of the pipette tip extension. On the other hand, in a binding reaction between a coated immune reactive molecule, as it is the case in an ELISA (Enzyme-Linked Immunosorbent Assay), or in a liquid-liquid extraction using an immobilized liquid coating, it would be rather advantageous to position the pipette tip symmetrically within the pipette tip extension and establish a continuous fluid uptake area (but e.g. with a relatively small width) around the pipette tip. The distance element(s) therefore function as spacers which allows the fluid uptake area being further limited or defined by a pipette tip when such a pipette tip is inserted into the pipette tip extension.

One distance element is sufficient to space an inserted pipette tip apart from the inner side of the exterior wall for forming a channel between the outer side of the inserted pipette tip and the inner side of the pipette tip extension. This channel may take up a fluid which is to be moved between the pipette tip and the pipette tip extension. The use of two or more distance elements may be preferred to provide a seat for a pipette tip in which this pipette tip does not contact the inner side of the exterior wall.

Neither when using one nor when using more distance elements, a distance element does not extend circumferentially along the inner side of the exterior wall, so that the pipette tip extension or the fluid uptake area, respectively, is never closed towards the reception aperture. The reception aperture at the proximal end of the pipette tip extension is during use at least partially open and thus not completely closed, e.g. by a cover, a seal, the pipette tip it is attached to, or a combination thereof. By remaining in fluid connection to the surrounding atmosphere, sufficient pressure equalization is ensured when a liquid is dispensed from a pipette tip into the fluid uptake area of an attached pipette tip extension.

The distance elements subdivide the inner cavity into a fluid uptake area and a pipette tip hosting area, which correspond to the later position of an inserted pipette tip. The depth of each distance element, which corresponds to the length, by which the respective distance element protrudes from the inner wall of the pipette tip extension towards the medial axis, may in particular define the volume of liquid which may be taken up in the fluid uptake area. By adapting the depth of a distance element, it may further be controlled whether for example a pipette tip is inserted in a friction fit manner, which allows the pipette tip extension being transported by the inserted pipette tip, or whether a pipette tip is inserted without a clamping effect.

In the context of the present invention, a fluid may be any type of liquid or gas, for example a liquid sample, a reagent, a buffer, etc. The fluid may also be a mixture of different liquids (e.g. an emulsion), a mixture of different gases, a mixture of a liquid and a gas (i.e. an aerosol), or a mixture of a liquid and a solid dispensed in said liquid (i.e. a suspension). Solid particles may for example be abrasive particles such a sand, or may be magnetic beats. The liquid may also be a solvent for molecules of interest.

The present invention is particularly configured for interacting with a liquid and/or for interacting with a target molecule which is present in the fluid. The target molecule may also be named analyte in the present context.

The bottom is connected to the exterior wall at the distal end. Both, the bottom and the exterior wall, which extends circumferentially around a medial or longitudinal axis, respectively, form a common container-like structure which is attachable to a conventional pipette tip in a way that the pipette tip extension forms a cup for the end of the pipette tip which comprises a dispense aperture. However, the cup extends the inner fluid channel of the inserted pipette tip into the inner cavity of the pipette tip extension.

The coating in the present context may be a reactive coating or reactive layer immobilized on the inner side of the exterior wall. The coating may be reactive in particular for one or more analytes or liquids, which are provided in a fluid to be dispensed into the pipette tip extension. The reactive coating may comprise one or more substances which are reactive for the respective target. The reactive substance may for example be a solid or a liquid or salts, molecules, or other.

The coating has the purpose of interacting with a fluid which is present in the fluid uptake area. It may be of any material which is suitable for interacting with a fluid which is for example dispensed by a pipette tip into the pipette tip extension after the tip has been inserted. Interacting with a fluid includes in this case the mutual interaction of a fluid or single components thereof with the coating present in the pipette tip extension. An interaction may base for example on the establishment of a chemical binding or physical interaction.

The application of the coating onto the desired surface in the inner cavity may depend on the nature of the coating. The coating may be desired to adhere to the surface. In the exemplary case of a coating being lyophilized reagents, the coating may for example be soluble. Coating in this case may for example involve a low temperature dehydration process that involves freezing, lowering the pressure, and then removing ice by sublimation. Coating may in this case on the other hand involve dehydration by evaporating water.

In other cases, the coating may be not easily washed away or insoluble. In the case of antigens constituting a coating, they may for example be directly attached by passive adsorption, for example using a carbonate/bicarbonate buffer.

The application of a coating may involve an activation of the surface of the pipette tip extension. In a case which involves a coating, for example a polymer coating, comprising cross-linker agents, an activation of the cross-linking agent after the coating process may be involved.

Particular analytes of interest are for example contained in biological samples, such as body fluids (e.g. blood, blood serum, urine), in food samples (for example beverages), drinking water, waste water, environmental samples, or other.

In an embodiment of the invention, which may be combined with any other of the embodiments which were or will be mentioned, unless there is a contradiction, the coating is applied on the inner side of the exterior wall and/or on a side of the bottom facing towards the inner cavity, and/or on the one or on more distance elements.

The choice which areas of the inner cavity are covered by the coating may depend for example on the characteristics of the coating, conditions of the desired assay, or others. The choice might not be restricted to the type of surface, but also for example to the height by which the coating covers the respective surface in a longitudinal direction. It is for example possible that the coating extends over the complete height or length of the pipette tip extension (viewed along the longitudinal direction or along the medial axis, respectively). It is however also possible that the coating covers the respective surface only over a partial length along the longitudinal direction.

In embodiments in which a coating is present on the inner side of the exterior wall, the fluid uptake area is established adjacent to the surface of the coating which faces towards the inner cavity. In these situations is the immediate inner side of the exterior wall occupied by the coating, and the fluid uptake area is adjacent to the coating instead of the inner side of the exterior wall. Although this circumstance is not always expressed in some definitions of the fluid uptake area, the skilled person may recognize this circumstance without an explicit definition.

In an embodiment of the invention, which may be combined with any other of the embodiments which were or will be mentioned, unless there is a contradiction, the coating is selected from:
  a sorption layer for an extraction of a target molecule,
  a coating for a binding assay, or
  a lyophilized or a dehydrated reagent.

A sorption layer for an extraction of a target molecule is understood as a being configured for carrying out an enrichment step of a target molecule within a phase or at an interphase between two phases, also known as a sorption reaction. Sorption reactions are for example used when target molecules are present in very small amounts. A sorption layer according to the present invention may be configured to selectively react or physically interact with a specific target molecule. Examples for sorption reactions are adsorption reactions in a solid phase extraction, while an absorption reaction is known in liquid-liquid extraction. A particular suitable use of a sorption layer is for the preparation of a sample for example for a later liquid chromatography combines with mass spectrometry (LC-MS).

A coating for a binding assays may for example applied in detecting in particular biological molecules or in the determination of their concentration. Exemplarily mentioned are antibody-based binding assays. A coating for binding assays may particularly react with biological molecule which are present in biological samples.

A lyophilized reagent is in the context of the present invention a solid which is the result of a fluid or a liquid that has been lyophilized. A lyophilized reagent may optionally comprise one or more molecules, which has been lyophilized. Lyophilization is a generally known process, and is for example applied for increasing the durability of the respective fluid or liquid, and/or as a protection measurement against contamination. A lyophilized reagent may particularly react with a solvent liquid which is present in the fluid uptake are.

A dehydrated reagent is in the context of the present invention a solid which is the result of a fluid or a liquid that has been dehydrated by evaporating water, buffer or solvent. A dehydrated reagent may optionally comprise one or more molecules.

In an embodiment of the invention, which may be combined with any other of the embodiments which were or will be mentioned, unless there is a contradiction, the coating is a sorption layer for an extraction of a target molecule, and the coating is configured as:
  a sorption layer for a liquid-liquid extraction,
  a sorption layer for a solid phase extraction, or
  a functionalized sorption layer.

A sorption layer for a liquid-liquid extraction may be of a sorbent material including polydimethylsiloxane (PDMS), polydiphenylsiloxane, polytrifluoropropylelmethylsiloxane, a polyacrylate phase, or an extraction layer mainly composed of ethylene-acrylate-copolymer. "Mainly composed" is understood in the context of the present invention that the sorptive extract layer consist to at least 90 weight-%, in particular to at least 95 weight-% of ethylene-acrylate-copolymer. The term "ethylene-acrylate-copolymer" means in the context of the present invention that at least one type of ethylene-acrylate-copolymer is present, but it may comprise also mixtures of more than one ethylene-acrylate-copolymer.

The ethylene-acrylate-copolymer of the sorptive extraction layer may further be an amorphous ethylene-acrylate-elastomer, also known under the abbreviation AEM. It may in particular be that the amorphous ethylene-acrylate-elastomer is an amorphous ethylene-methylacrylate-dipolymer. It may however also be possible that the amorphous ethylene-acrylate-elastomer is an amorphous ethylene-methylacrylate-terpolymer. The ethylene-acrylate-copolymer may alternatively be a partially crystalline ethylene-acrylate-copolymer. In this variant it may be possible that the partially crystalline ethylene-acrylate-copolymer is a partially crystalline ethylene-methylacrylate-copolymer. A particularly suitable sorption layer for an immobilized liquid-liquid extraction is for example a layer using the TICE™ (TECAN immobilized Coating Extraction) technology.

In the case the coating is a sorption layer for liquid-liquid extraction, it may be provided that the configuration of the distance elements are particularly adapted to the desired application. In particular, the distance element(s) may be adapted to position the inserted pipette tip at a relatively small distance to the inner side of the exterior wall, as in liquid-liquid extraction, it is of advantage to provide a small gap between the surface of the coating facing towards the inner cavity and the outer side of the pipette tip extension.

By way of example, a pipette tip extension being configured for liquid-liquid extraction using TICE™ technology, may comprise a coating thickness of approximately 0.02 mm when being adapted to be attachable to a conventional 1000 µl disposable pipette tip. In this example, the width of the fluid uptake area, which corresponds to the distance between the inner side of the exterior wall and the outer side of the inserted pipette tip may be approximately 0.2 mm, which allows a relatively short extraction time.

A sorption layer for a solid phase extraction is for example of a material chosen from a group comprising non-polar, polar, ion exchange (cation and anion) material, and combinations thereof. Solid phases may comprise silica functionalized with hydrocarbon chains, for example C18 non-polar chains. Hydrocarbon chains may differ in length and in additional functional groups like $R-NH_3^+$ or $R-SO_3^{2-}$ for ion exchange applications. Alternatively, particles coated with functionalized silica may be embedded in a polymer coating applied to the inner surface of the tip extension.

A functionalized sorption layer is for example a coating comprising antibodies or antigens, or a material for an affinity chromatography. Affinity chromatography is a method of separating biochemical mixture based on a highly specific interaction between antigen and antibody, enzyme and substrate, receptor and ligand, or protein and nucleic acid. End groups interacting with the analyte of interest may be bound to linkers which are bound to a solid support. The solid support may be a plasma activated polymer or a cross-linked polymer applied to the inner surface of the tip extension. A layer is functionalized when it comprises chemical functional groups, for example R—COOH, R—SH (for example for the generation of disulphide bridges), or R—OH (for example for the generation of hydrogen bonds).

In an embodiment of the invention, which may be combined with any other of the embodiments which were or will be mentioned, unless there is a contradiction, the sorption layer is configured for the extraction of a target molecule from a sample, the target molecule being selected from a group comprising proteins, peptides, DNA molecules, RNA molecules, vitamins, hormones, drugs, a medication substance, metabolites, pesticide, pollutants, organic compounds, inorganic compounds or molecules, salts, metals, and metal ions.

In an embodiment of the invention, which may be combined with any other of the embodiments which were or will be mentioned, unless there is a contradiction, the coating is configured as a coating for a binding assay, the coating preferably comprising a biologically active substance, selected from a group comprising an antibody or an antigen.

Binding assays which involve a coating comprising an antibody or an antigen are also called immunoassays. By use of immunoassays, the presence or concentration of a macromolecule or a small molecule (which however has an antigen structure) in a solution may be measured through the use of an antibody or an antigen. Suitable molecules which may be detected by immunoassays are in particular proteins or peptides for example from body fluids. Exemplarily mentioned are for example viral or bacterial peptides or antibodies against such peptides, allergens, endogenous serum proteins specific for example for pregnancy or distinct oncology markers.

In an embodiment of the invention, which may be combined with any other of the embodiments which were or will be mentioned, unless there is a contradiction, the coating comprises a binding substance of an ELISA assay or of a partial step thereof.

Enzyme-linked immunosorbent assays (ELISA) are generally known in the art. In the simplest form of an ELISA, antigens from a sample are attached to a surface. Then, a matching antibody is applied over the surface so it can bind to the antigen. This antibody is linked to an enzyme, and in the final step, a substance containing the enzyme's substrate is added. The subsequent reaction produces a detectable signal, most commonly a color change. The effect of the enzyme is an enhanced color signal because each enzyme processes a multitude of substrate molecules.

In an embodiment of the invention, which may be combined with any other of the embodiments which were or will be mentioned, unless there is a contradiction, the coating is a lyophilized reagent which is selected from a group comprising a nucleic acid, such as a DNA molecule or a RNA molecule, a protein, a peptide, a biological cell, a buffer or assay reagent, or a biological sample, or a combination thereof.

In this embodiment, the pipette tip extension is prefilled with a lyophilized reagent. It is a particular advantage to provide such prefilled reagents in a lyophilized form for storing these reagents. For the required use, the reagent may then be resolved in the desired amount and type of liquid, which is required for the reaction or assay.

In an embodiment of the invention, which may be combined with any other of the embodiments which were or will be mentioned, unless there is a contradiction, the bottom and the exterior wall are formed as one piece. The pipette tip extension of this embodiment functions as a structurally stable cup-like attachment.

In an embodiment of the invention, which may be combined with any other of the embodiments which were or will be mentioned, unless there is a contradiction, the bottom and the exterior wall are configured as being impervious to fluids. In this embodiment it is ensured that for example a liquid which is moved between a pipette tip and the pipette tip extension is fully prohibited to move out of the fluid uptake area in the bottom region or on the side in the region of the exterior wall. Neither the bottom nor the exterior wall may provide for example a filtering function, for example for separating a liquid from a liquid-liquid or liquid-solid phase extraction or separation.

Suitable materials are for example a plastic polymer such as polypropylene, polyethylene, or a fluoroelastomer, or of glass or a metal such as aluminum or steel. A plastic has the advantage of being in addition relatively cheap concerning production costs, and being slightly deformable. This allows to attach the pipette tip extension for example in a friction fit manner to a pipette tip. It is also the preferred material for a disposable use. However, it is also possible to attach the pipette tip extension by means of form fit, e.g. by a tongue and groove connection. Another suitable material is polytetrafluoroethylene.

In an embodiment of the invention, which may be combined with any other of the embodiments which were or will be mentioned, unless there is a contradiction, the pipette tip extension may be of a chemically inert material, for example of a plastic polymer such as polypropylene, polyethylene, or a fluoroelastomer, or of glass or a metal such as aluminum or steel. A plastic has the advantage of being chemically inert, relatively cheap concerning production costs, and being slightly deformable. This allows to attach the pipette tip extension for example in a friction fit manner to a pipette tip. It is also the preferred material for a disposable use. However, it is also possible to attach the pipette tip extension by means of form fit, e.g. by a tongue and groove connection. Another suitable chemically inert material is polytetrafluoroethylene.

In an embodiment of the invention, which may be combined with any other of the embodiments which were or will be mentioned, unless there is a contradiction, the pipette tip extension comprises a cover which closes the reception aperture. The cover is particularly useful for protecting the coating within the inner cavity. Protection may be aimed for example against contamination, drying out, drawing moisture, or other conditions.

In an embodiment of the invention, which may be combined with any other of the embodiments which were or will be mentioned, unless there is a contradiction, the cover is configured as being removable or configured being pierceable by a pipette tip.

A particular suitable material for a removable cover is for example aluminum foil, Nunc™-sealing tapes, polyolefine, optionally coated for example with an acrylic adhesive or a silicone-based adhesive. A particular suitable material for a pierceable cover is for example polyethylene, optionally coated with a silicone, polyvinyl, polyester, or a rayon-based material.

In an embodiment of the invention, which may be combined with any other of the embodiments which were or will be mentioned, unless there is a contradiction, at least one of the distance elements comprises a stop surface which is directed towards a medial axis, i.e. radially facing towards a medial axis, of the pipette tip extension. The stop surface can be abutted by a pipette tip when the pipette tip extension is attached to the pipette tip.

The stop surface of a distance element is in the context of the present invention the contact point or contact surface which is abutted by a pipette tip when the pipette tip extension is attached to said pipette tip. The stop surface therefore marks the border at that specific position between the fluid uptake area and the pipette tip hosting area.

In an embodiment of the invention, which may be combined with any other of the embodiments which were or will be mentioned, unless there is a contradiction, stop surfaces of several distance elements together form a common stop surface in the inner cavity which can be abutted by an inserted pipette tip, i.e. can be brought into alignment with an inserted pipette tip. The distance elements are in particular dimensioned so that the common stop surface approaches the medial axis towards the distal end of the pipette tip extension. The common stop surface contributes to the definition of the pipette tip hosting area and the boarder of the fluid uptake area, respectively.

In an embodiment of the invention, which may be combined with any other of the embodiments which were or will be mentioned, unless there is a contradiction, the stop surface of each distance element is essentially parallel to the inner side of the exterior wall. This is particularly advantageous when the exterior wall of the pipette tip extension is adapted in shape to the exterior wall of a pipette tip to be inserted, that is when both walls, namely the exterior wall of the pipette tip extension and the exterior wall of the pipette tip, are arranged parallel to each other when assembled.

It is for example particularly useful to adapt the number of distance elements and/or depth of each distance element to the outer dimensions of a pipette tip to which the pipette tip extension shall be attached to. This adaptation may be done for example in view of the outer dimensions of the pipette tip and/or in view of the intended friction between the inserted pipette tip and the pipette tip extension, depending on whether a tight friction fit is intended or only a loose insertion is intended. It may further be useful to adapt these parameters to the volume of liquid which shall be taken up in the fluid uptake area of the pipette tip extension. For example, the uptake volume of a pipette tip extension might correspond to the nominal volume of the pipette tip to which the pipette tip extension shall be attached.

In an embodiment of the invention, which may be combined with any other of the embodiments which were or will be mentioned, unless there is a contradiction, the pipette tip extension comprises one or more distance elements which are arranged flush with respect to the proximal end of the pipette tip extension, and/or comprises one or more distance elements which are arranged offset with respect to the proximal end of the pipette tip extension.

The length of the offset may for example be coupled or combined with one or more tapering steps in the exterior wall. The length might be adapted to the outer dimensions of the pipette tip which shall be inserted into the pipette tip extension.

In an embodiment of the invention, which may be combined with any other of the embodiments which were or will be mentioned, unless there is a contradiction, the pipette tip extension comprises at least two distance elements, preferably at least three distance elements.

In an embodiment of the invention, which may be combined with any other of the embodiments which were or will be mentioned, unless there is a contradiction, at least one, preferably each distance element is configured as elongated bar which extends along a direction from the proximal end towards the distal end of the pipette tip extension.

In a deviating embodiment, other types of protrusion configurations at the inner side of the exterior wall of the pipette tip extension are possible, such as noses, as well as varying forms such as straight or snake- or wave-like bars. Combinations of protrusions of different types or forms are possible. Irregular forms are particularly suitable for providing an additional mixing effect to the liquid which is introduced into the pipette tip extension. It might be possible that only one inner distance element is provided at the inner side of the exterior wall, as long as it is suitable to allow the formation of a fluid uptake area in the inner cavity of the pipette tip extension. In the case only one distance element is used, the pipette tip hosting area may be acentric with respect to the medial axis of the pipette tip extension. A multitude of distance elements is also possible, which allows a more precise definition of the location of the pipette tip hosting area and the fluid uptake area within the inner cavity of the pipette tip extension. However, also the use of a multitude of distance elements allows an acentric positioning of a pipette tip within the inner cavity of the pipette tip extension. In particular by coordinating the depth of each distance element in dependence on the inner form of the pipette tip extension, it may be defined whether a pipette tip will be positioned within a pipette tip extension in a centric or acentric manner.

In an embodiment of the invention, which may be combined with any other of the embodiments which were or will be mentioned, unless there is a contradiction, the one or more distance elements at the inner side of the exterior wall extend in a direction from a proximal region of the pipette tip extension towards the bottom of the pipette tip extension. The distance elements are for example configured as inner bars of the same or varying width, and/or which are more elongated along the direction from the proximal to the distal end than they are wide, with the width being the dimension along a lateral direction. The use of at least two or more elongated distance elements is particularly suitable for a precise positioning of a pipette tip within the pipette tip extension. For example, a multitude of shorter distance elements, which are positioned for example in an irregular array in an alternating manner to each other and/or along the direction from the proximal end towards the distal end may be possible, a lower number of distance elements which are longer and arranged in a regular array at the inner side of the exterior wall, or a mixture thereof are possible. As an additional or alternative provision, it may be foreseen to provide for example an elastomeric plastic material onto the distance elements, which may be applied by a two component injection molding step, for enhancing the holding force of the pipette tip extension on the pipette tip.

In an embodiment of the invention, which may be combined with any other of the embodiments which were or will be mentioned, unless there is a contradiction, the distance elements extend essentially continuously from the proximal region of the pipette tip extension to the distal region of the pipette tip extension. Such an arrangement is particularly suitable for distance elements, which are for example configured as inner bars, and allows for example a simplification of the manufacturing process, e.g. in an injection molding process.

In an embodiment of the invention, which may be combined with any other of the embodiments which were or will be mentioned, unless there is a contradiction, the exterior wall has a shape which is adapted to an outer shape of a pipette tip to which the pipette tip extension shall be attached. In particular, the shape of the exterior wall is adapted to the shape of the outer wall of said pipette tip.

Adapted can inter alia mean that at least parts of the exterior wall of the pipette tip extension show a shape similar to the outer shape of a pipette tip but in a different dimension, preferably in a larger dimension. It may be possible that in particular the inner side of the exterior wall of the pipette tip extension is adapted in its shape to the outer shape of a pipette tip.

In an embodiment of the invention, which may be combined with any other of the embodiments which were or will be mentioned, unless there is a contradiction, the exterior wall is a circumferential wall which tapers towards the lower end of the pipette tip extension.

The exterior wall may define the form and the outer dimensions of the pipette tip extension, which may be for example an oblong hollow body, which tapers at least in parts conically, e.g. in the region of the distal end, or tapers completely. The pipette tip extension may further be of an axially symmetric form, although an axially asymmetric form is possible too. Exemplarily, a pipette tip extension of 30 mm length is suitable, when a 200 µl volume pipette tip of 60 mm length shall be used and a liquid volume of 100 µl shall be dispensed and/or aspirated. The exterior wall may taper over the total length, or may additionally comprise for example cylindrical sections, which are preferably located at the proximal end of the pipette tip extension.

In an embodiment of the invention, which may be combined with any other of the embodiments which were or will be mentioned, unless there is a contradiction, the reception aperture may have a circular cross section, in a plane orthogonally to the medial axis of the pipette tip extension, which is particularly suitable for inserting a pipette tip, although it might be possible that the reception aperture has a deviating cross-sectional shape.

In an embodiment of the invention, which may be combined with any other of the embodiments which were or will be mentioned, unless there is a contradiction, the inner diameter of the reception aperture of the pipette tip extension may be 6 mm, and the outer diameter of the tip of the pipette tip which shall enter the reception aperture may be about 1 mm. Such an extension is suitable for example when a disposable pipette tip is used having an outer diameter of approximately 5 mm which shall rest within the reception aperture of the pipette tip extension, or when a fixed tip is used having an outer diameter of approximately 4 mm. The space between the inner diameter of the reception aperture and/or the inner side of the exterior wall may be controlled by one or more distance elements.

In an embodiment of the invention, which may be combined with any other of the embodiments which were or will be mentioned, unless there is a contradiction, the pipette tip extension comprises a constriction element for controlling an insertion depth of a pipette tip within the pipette tip extension, the constriction element defining a gap height between a distal end of an inserted pipette tip and the distal end of the pipette tip extension.

The constriction element defines a gap height between a distal end of an inserted pipette tip and the distal end of the pipette tip extension. In particular, the constriction element establishes the gap between the distal end of the pipette tip and the bottom of the pipette tip extension.

The constriction element functions as a stopper element which is able to restrict the insertion depth of a pipette tip when the pipette tip extension is attached to said pipette tip. The constriction element shall in particular prevent that the distal end of a pipette tip, which is inserted, abuts the bottom of the pipette tip extension and thereby closes the outlet opening of the pipette tip. By restricting the insertion of a pipette tip to a defined depth within the inner cavity of the pipette tip extension according to the invention, a gap, or a corresponding gap height, is defined which is generated when a pipette tip is inserted until the insertion is stopped at the constriction element.

The gap height, which is e.g. generated when a pipette tip is inserted under a controlled manner with the aid of the constriction element, may for example be 0.1 mm to 1 mm. Depending on the intended application, the gap height might by more than 1 mm.

In the context of the present invention, the gap describes the space between the bottom of the pipette tip extension and the distal end of a pipette tip, which is generated when the pipette tip extension and the pipette tip are assembled. The gap serves as a fluid connection between the inner cavity of the pipette tip and the fluid uptake area of the pipette tip extension and is also a part of the fluid uptake area. Upon insertion of the pipette tip, a fluid flow between the inner cavities of the pipette tip and the pipette tip extension is possible. Depending on the inner geometry at the distal end of the pipette tip and the number, dimensions and position of the constriction element, the volume of liquid and the flow rate can be influenced. A higher flow rate would in particular maximize a mixing effect.

In an embodiment of the invention, which may be combined with any other of the embodiments which were or will be mentioned, unless there is a contradiction, the constriction element is formed by:

a stop surface or a part thereof of the one or more distance elements which is directed towards a medial axis of the pipette tip extension, and/or one or more spacing blocks arranged at the bottom in the inner cavity of the pipette tip extension.

A constriction element may thus be formed for example one or more distance elements and/or by other parts.

When the constriction element is formed by the stop surface of the one or more distance elements, or parts thereof, the dimensions of the distance elements are adapted so that—when a pipette tip is inserted into the pipette tip extension—the pipette tip abuts the stop surfaces and comes to an end position within the inner cavity when the distal end of the pipette tip has not reached the bottom of the pipette tip extension. In this case, it is particularly the depth of the distance element that is defining how far the distance element protrudes into the inner cavity and which depth may be used to define the gap height.

When the constriction element is formed by one or more spacing blocks arranged at the bottom in the inner cavity of the pipette tip extension, a pipette tip abuts the upper surface of the one or more spacing blocks, and the spacing block functions as a stopper element here. The gap has in this case a gap height which corresponds to the height of the spacing block by which the spacing block protrudes into the inner cavity of the pipette tip extension along the longitudinal axis).

A spacing block may be configured as an independent structure connected to the bottom or being formed as a protrusion from the bottom. A spacing block may however also be formed by a distal end of a distance elements. In this case, the distal end of the distance element forms an additional protrusion towards the medial axis of the pipette tip which extends along the inner side of the bottom. In a further alternative embodiment, a spacing block may be formed by a protrusion of the exterior wall at the inner side, extending towards the medial axis of the pipette tip extension and along the inner side of the bottom.

A spacing block may comprise one or more additional positioning elements to better position the distal end of a pipette tip within the bottom region of the pipette tip extension.

Combinations of different embodiments of spacing blocks in one pipette tip extension may be possible as well as the use of similarly configured spacing blocks.

In an embodiment of the invention, which may be combined with any other of the embodiments which were or will be mentioned, unless there is a contradiction, the constriction element is formed by two or more spacing blocks arranged on the inner side of the bottom of the pipette tip extension. The spacing blocks are arranged on the inner side of the bottom in a random-like pattern or in a defined pattern, for example in a star-like pattern.

The use of a constriction element has the advantage that the insertion depth of a pipette tip within the pipette tip extension is controllable by a physical structure. The control of the insertion depth may ensure that the pipette tip leaves a gap below its distal end when positioned within the pipette tip extension. The gap allows the liquid being transported from the pipette tip over the gap into the fluid uptake area of the pipette tip extension. The gap functions as a fluid connection between the inner cavity of the pipette tip and the fluid uptake area of the pipette tip extension. In an advantageous embodiment, the distance element(s) and eventually present constriction element(s) is or are arranged in such a manner that a continuous fluid uptake area is generated along the inner side of the pipette tip extension, which means that preferably no isolated channels are generated but that each generated fluid uptake area is in fluid connection with the other fluid uptake areas. This ensures that the liquid which is moved between the pipette tip and the pipette tip extension and over the sample remains homogeneously.

Although the constriction element is not compulsory for a controlled insertion of a pipette tip into the pipette tip extension, as the insertion depth might be controlled alone by the used force for the insertion, a constriction element is an additional safeguard to ensure a repeatable gap height. As an additional or alternative provision, it may be foreseen to provide for example an elastomeric plastic material onto the constriction element, which may be applied by a two-component injection molding step, for enhancing the holding force of the pipette tip extension on the pipette tip.

Without a constriction element, the insertion of a pipette tip into a pipette tip extension may be controlled by control of the force used for the insertion. In the context of a liquid handling workstation, the required forced may for example be controlled by a current limitation used for the movement of the pipetting channel to which the pipette tip extension is associated. The required force may be dependent from the dimensions of the pipette tip, the dimensions of the pipette tip extension which shall be attached to the pipette tip, but also for example by the material of the pipette tip and pipette tip extension, for example by their hardness or elasticity.

In an embodiment of the invention, which may be combined with any other of the embodiments which were or will be mentioned, unless there is a contradiction, the pipette tip extension is configured as being ejectable from a pipette tip by an ejection mechanism of a liquid handling workstation.

The ejection mechanism may for example be a passive mechanism of for example a rake-like structure, or a passive mechanism. By use of a passive mechanism, typically a pipette tip or in this case a pipette tip extension may be removed by moving the corresponding pipetting channel and thereby moving the pipette tip extension against the tines of the rake, while the ejection mechanism is stationary. By use of an active mechanism, the ejection mechanism itself is moved in relation to the pipette tip extension, and thereby actively removes the pipette tip extension from the pipette tip. The frictional connection in this case between a pipette and a disposable pipette tip is advantageously greater than the frictional connection between the disposable pipette tip and the attached pipette tip extension.

The features of the above-mentioned embodiments of the pipette tip extension can be used in any combination, unless they contradict each other.

Another aspect of the invention concerns an assembly comprising a pipette tip for aspirating and/or dispensing a liquid, a pipette tip extension attached to the pipette tip, one or more distance elements for spacing apart the pipette tip from the attached pipette tip extension, and a coating facing towards the fluid uptake area. The pipette tip extension comprises a proximal end, a distal end, and an exterior wall extending between the proximal end and the distal end. The exterior wall has an outer side and an inner side and forms at the proximal end a reception aperture for inserting the pipette tip. The pipette tip extension further comprises a bottom at the distal end, and an inner cavity enclosed by the inner side of the exterior wall and the bottom. The one or more distance elements for spacing apart the pipette tip from the attached pipette tip extension, the one or more distance elements are dimensioned to establish a fluid uptake area adjacent to the inner side of the exterior wall, the bottom and the inserted pipette tip. The fluid uptake area extends from the bottom up to the reception aperture and is in fluid connection with the surrounding atmosphere at the reception aperture.

The pipette tip extension may comprise one or more features as described above in the context of the single pipette tip extension. These features and/or different embodiments can be used in any combination unless they contradict each other. The definitions given to the pipette tip extension above apply also to the pipette tip extension being part of the assembly.

Another aspect of the invention concerns a method of treating a liquid. The method comprises the following steps: Providing a pipette tip extension in an embodiment as discussed above. A liquid is aspirated into a pipette tip. The pipette tip filled with the liquid is inserted into the pipette tip extension. The liquid is dispensed into the fluid uptake area of the pipette tip extension. The liquid thereby contacts the coating. The liquid is allowed to interact with the coating. The liquid is selected from a group comprising a liquid with or without an analyte or a biological sample.

The pipette tip for carrying out the method as described herein or in embodiments as described in the following, may be a commonly available disposable pipette tip, or alternatively a so-called fixed tip as described above in the context of discussing the pipette tip extension. These definitions given there may equally be applied to the discussion of the method as described in the following.

In an embodiment of the invention, which may be combined with any other of the embodiments which were or will be mentioned, unless there is a contradiction, the method comprises the step of moving the liquid one or multiple times between the pipette tip extension and the fluid uptake area of the pipette tip extension, thereby increasing the interaction between the liquid and the coating.

Mixing is carried out by using the assembly of pipette tip extension and pipette tip, instead of for example transferring the pipette tip extension to a mixing device. However, it is possible to instead or additionally transfer the pipette tip extension comprising the liquid in the fluid uptake area to such a mixing device. It is of a particular advantage to transport in this case the pipette tip extension by means of the pipette tip when for example the pipette tip is functionally connected to a liquid handling workstation. Otherwise, the pipette tip extension may be transported for example in a distinctively adapted extension carrier, which then may in turn be transported automatically by means of a robotic gripper of a liquid handling workstation. Manual transport is also possible if required.

In an embodiment of the invention, which may be combined with any other of the embodiments which were or will be mentioned, unless there is a contradiction the coating is a lyophilized reagent, and wherein the liquid is a solvent solution for the lyophilized reagent.

In this situation, the interaction is solving the lyophilized reagent in the solvent solution. Suitable reagents and solvent solutions are described above. The dissolved reagent may then be further transferred to follow-up reactions.

In an embodiment of the invention, which may be combined with any other of the embodiments which were or will be mentioned, unless there is a contradiction, the coating is a coating for a binding assay, preferably an immobilized antibody or antigen, and wherein the liquid comprises a biological sample comprising a protein or peptide.

In this situation, the interaction is a binding reaction between an antibody and a corresponding antigen. In particular, the coating may be configured for carrying out an ELISA-assay, or other reactions as described above.

In an embodiment of the invention, which may be combined with any other of the embodiments which were or will be mentioned, unless there is a contradiction, the coating is a sorption layer for an extraction of a target molecule, and the liquid comprises the target molecule.

In this situation, the target molecule is adsorbed or absorbed by the sorptive layer. The sorptive layer may be configured for example for carrying out a solid phase extraction or an immobilized liquid phase extraction as described above.

In an embodiment of the invention, which may be combined with any other of the embodiments which were or will be mentioned, unless there is a contradiction, the method further comprises the steps of:
- aspirating the liquid back into a pipette tip and discarding the liquid. This step may remove the supernatant liquid after the target molecule is absorbed or adsorbed by the coating.
- inserting a pipette tip comprising a wash solution into the pipette tip extension, and dispensing the wash solution into the fluid uptake area by using a pipette tip, and
- optionally moving the liquid one or multiple times between the pipette tip extension and the fluid uptake area of the pipette tip extension.

This washing step may optionally be repeated one or more times if required. Suitable washing solutions are for example PBS buffer with a small amount of surfactant or commercially available buffers, e.g. BUF031A (Bio-Rad laboratories, Inc., Hercules CA, USA).

In an embodiment of the invention, which may be combined with any other of the embodiments which were or will be mentioned, unless there is a contradiction, the method further comprises the steps of:
- aspirating the liquid back into a pipette tip and discarding the liquid,
- inserting a pipette tip comprising an elution solution into the pipette tip extension, and dispensing the elution solution into the fluid uptake area by using a pipette tip, and
- optionally moving the liquid one or multiple times between the pipette tip and the fluid uptake area of the pipette tip extension. A suitable number of moving the liquid between the pipette tip and the fluid uptake area of the pipette tip extension is for example between 2 times and 6 times, in particular 3 times or 5 times.

The elution step may optionally be repeated one or more times if required. Suitable elution solutions are for example methanol, acetonitrile (e.g. 90%) or mixtures thereof, or for example $H_2O/CH_3CN$ (15/85; v/v)+0.2% formic acid.

In an embodiment of the invention, which may be combined with any other of the embodiments which were or will be mentioned, unless there is a contradiction, the pipette tip extension is moved by moving the pipette tip inserted into the pipette tip, using a handheld pipette or a pipette of a liquid handling workstation.

A handheld pipette (or also called pipettor) is configured for the manual or at least semi-automatic use by a laboratory staff. A manual use may have the advantage that the method may be carried out with method steps which are individually chosen and adapted to the actual situation.

Performing the method automatically by use of a liquid handling workstation has the advantage that a high number of samples may be treated in an accurate way with consistent quality and specificity. Liquid handling workstations are typically under the control of one or more controller, which control for example a pipetting robot, the liquids used, steps of aspirating, dispensing, mixing or other pipetting steps by a pipetting head, movements of pipettes, containers, etc.

In an embodiment of the invention, which may be combined with any other of the embodiments which were or will be mentioned, unless there is a contradiction, each step of aspirating, dispensing or moving the liquid is controlled by a liquid handling workstation, the liquid handling workstation comprising a pipette to which the pipette tip is attached.

It may alternatively be foreseen that only one or selected steps are carried out under the control of a liquid handling workstation, while other steps are carried out manually.

In an embodiment of the invention, which may be combined with any other of the embodiments which were or will be mentioned, unless there is a contradiction, the method further comprises the step of removing the pipette tip extension from the pipette tip by using an ejection mechanism of a handheld pipette or of a liquid handling workstation.

Possible ejection mechanisms have been explained beforehand. These explanations or definitions apply equally to the method embodiments.

The invention additionally relates to the use of a pipette tip extension as described herein in the manufacture of a treated liquid according to a method as described herein, and to the production of a test result based on a method carried out as described herein.

The features of the above-mentioned embodiments of the device and/or process can be used in any combination, unless they contradict each other.

BRIEF DESCRIPTION OF THE DRAWINGS

Embodiments of the current invention are described in more detail in the following with reference to the figures. These are for illustrative purposes only and are not to be construed as limiting. It shows FIG. 1A a schematic side view of a pipette tip extension in a first embodiment, FIG. 1B a schematic view onto the proximal end of the pipette tip extension of FIG. 1A, FIG. 1C a schematic sectional drawing of the pipette tip extension of FIG. 1A according to the intersection plane C-C as indicated in FIG. 1B, FIG. 1D a schematic sectional drawing of the pipette tip extension of FIG. 1A according to the intersection plane D-D indicated in FIG. 1B, FIG. 2A a schematic side view of an assembly comprising the pipette tip extension of FIG. 1A and an inserted pipette tip, FIG. 2B a schematic sectional drawing of the assembly of FIG. 2A, FIG. 3 a schematic overview drawing of a pipette tip extension in a further embodiment functionally integrated into a liquid handling workstation, FIG. 4A a schematic view of a selected embodiment of a distance element at the inner side of the exterior wall, FIG. 4B schematic views of various embodiments of distance elements at the inner side of the exterior wall, FIG. 5A a schematic perspective side view onto a pipette tip extension in a second embodiment, FIG. 5B a schematic and perspective longitudinal section of the pipette tip extension of FIG. 5A, FIG. 5C a schematic and perspective view of a cutaway-cross-section of the bottom region of the pipette tip extension of FIG. 5A, FIG. 6A a schematic perspective side view onto a pipette tip extension in a third embodiment, FIG. 6B a schematic and perspective longitudinal section of the pipette tip extension of FIG. 6A, FIG. 6C a schematic and perspective view of a cutaway-cross-section of the bottom region of the pipette tip extension of FIG. 6A, FIG. 7 a simplified schematic cross sectional view of the bottom of the pipette tip extension in the third embodiment with an inserted pipette tip, FIG. 8 a schematic overview of possible method steps which can be carried out with a pipette tip extension, and FIG. 9 a schematic overview of method steps involved in step VII-1 of FIG. 8 for recovering a target molecule from the coating.

DETAILED DESCRIPTION OF THE INVENTION

Figure 1A:
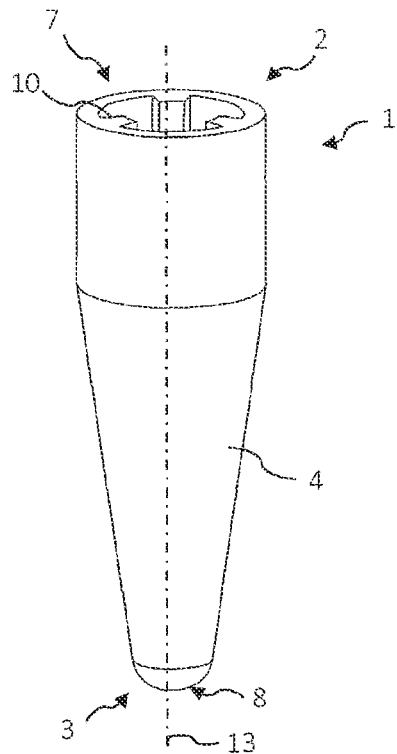

FIG. 1A shows an exemplary embodiment of a pipette tip extension 1 in a schematic side view. The pipette tip extension 1 here is an elongated, tube-like body with a proximal end 2 and a distal end 3. An exterior wall 4 extends between the proximal end 2 and the distal end 3, and forms said reception aperture 7 of the pipette tip extension 1. A bottom 8, which is connected to the exterior wall 4, closes the pipette tip extension 1 at the distal end 3. The exterior wall 4 and the bottom 8 enclose an inner cavity 9, more precisely the inner side 6 of the exterior wall 4 and the inner side of the bottom 8. The pipette tip extension 1 shown here is a rotationally symmetric body and further comprises three distance elements 10, which are configured as elongated bars and which are mounted flush with the proximal end 2, so that the proximal end of the exterior wall 4 and each proximal end of the distance elements form a common surface. The medial axis 13 is indicated, and corresponds here to the longitudinal axis of the pipette tip extension 1.

Along the longitudinal axis, the pipette tip extension 1 comprises three different sections: a more proximal section is formed as an essentially cylindrical tube, followed by a more distal section which tapers conically towards the bottom 8; the third section being the bottom 8. This embodiment shows one possibility to adapt the shape of the pipette tip extension 1 to the shape of a pipette tip 14 which is to be inserted into the pipette tip extension 1. In the present context, the term "a pipette tip extension 1 attachable/attached to a pipette tip 14" describes essentially the same situation as the term "a pipette tip 14 insertable/inserted into a pipette tip extension 1". Other adaptations of the shape and dimension of the pipette tip extension 1 are possible, as shown exemplarily in the FIGS. 5A-C and 6A-C. Such adaptations are not restricted to the choice of the shape of the exterior wall 4. For example, the number shape and/or dimensions of one or more of the distance elements 10 may be used to configure the pipette tip extension 1 as being attachable to a pipette tip 14.

Figure 1B:
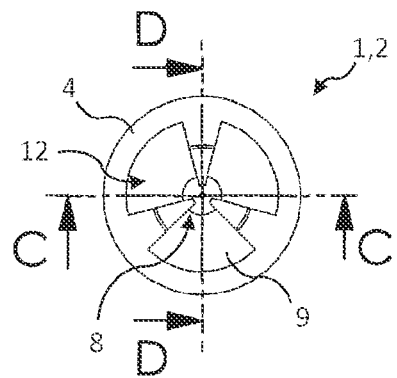

FIG. 1B shows a schematic view onto the proximal end of the pipette tip extension 1. The proximal surface is formed here commonly by the proximal end of the exterior wall 4 and the proximal end of the distance elements 10. The three distance elements are formed by the exterior wall 4 and protrude into the inner cavity 9. A pipette tip 14 which is inserted into the inner cavity 9 abuts the distance elements 10 so that the pipette tip 14 does not touch the inner side of the exterior wall 4 (see also FIGS. 2A and 2B). The distance element 10 or distance elements 10 therefore establish a fluid uptake area 12 which is essentially adjacent to the inner side of the exterior wall and within the inner cavity 9. The dimensions of the distance elements 10 may influence the volume of the fluid uptake area 12, though the coating 27 which naturally comprises a certain volume also influences the final volume of the fluid uptake area 12.

Figure 1C:
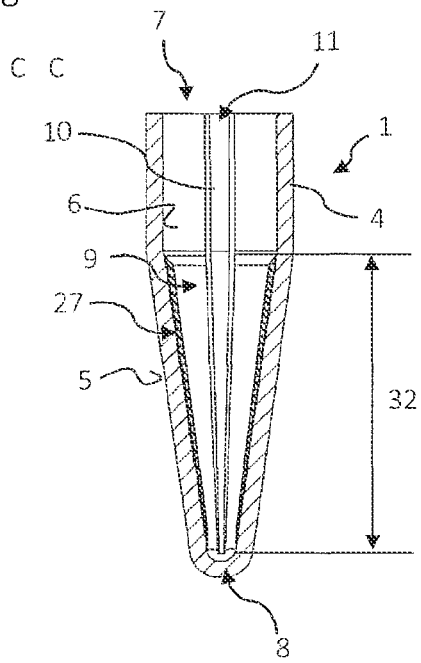
Figure 1D:
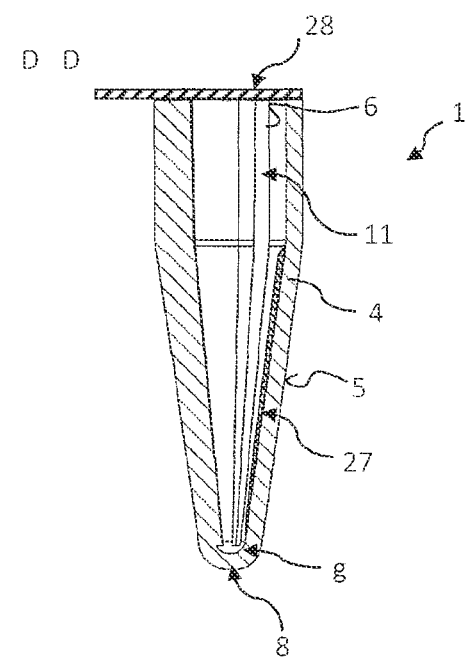

In FIG. 1B, the course of two intersection planes C-C and D-D are indicated, on which the FIGS. 1C and 1D are based on:

In FIG. 1C, a schematic sectional view of the pipette tip extension 1 according to the intersection plane C-C is shown. The pipette tip extension 1 of FIG. 1A can be seen here in a longitudinal section, which particularly allows a view onto one of the distance elements 10 which is configured as an elongated distance bar, a sectional view onto the bottom 8 of the pipette tip extension 1, and a sectional view onto the coating 27. As can be seen, the bottom 8 restricts the inner cavity 9 at the distal end 3 of the pipette tip extension 1. The bottom 8 and the exterior wall 4 lead seamlessly into one another and commonly form the inner side of the pipette tip extension 1. The distance bar reaches not up to the bottom 8 but leaves a gap g towards the bottom 8 in this case. In the embodiment shown, the distance bar(s) ensures that a pipette tip 14 which is inserted into the pipette tip extension 1 does not abut the bottom 8 but that a gap g of a gap height h is generated. In this way, which a continuous fluid flow between the inserted pipette tip 14 and the inner cavity 9 of the pipette tip extension 1 may be established.

The distance bar shown has a stop surface 11, which can be seen frontally. In this longitudinal section, the distance bar and its stop surface 11 extends essentially parallel to the exterior wall. This may allow an easy handling during the manufacturing process such as an injection molding process. A pipette tip 14 which is inserted abuts the stop surface of the distance bar, so that the insertion depth is controlled.

In this longitudinal section, the coating 27 can now also be seen. This coating 27 was not visible in the FIGS. 1A and 1B.

The coating 27 in this embodiment extends by a height 32 in a longitudinal direction along the tapering section of the pipette tip extension 1. In this embodiment, the proximal section and the bottom section do not comprise a coating 27, though it might be possible to cover also in these areas by a coating 27. The fluid uptake area 12 is in tapering area of the inner side 6 which is covered by a coating 27 adjacent to the coating 27, while in the proximal region and the bottom region, the fluid uptake area 12 is adjacent to the inner side 6 of the exterior wall 4 and the inner side of the bottom 8.

In FIG. 1D, a schematic sectional section of the pipette tip extension according to the intersection plane D-D indicated in FIG. 1B is shown. This section allows a view of the pipette tip extension of FIG. 1A in a longitudinal section, with a frontal view of one of the bars being cut (left side) and one of the bars shown in a side view. The gap g formed between the distal end of the cut distance bar on the left side and the inner side of the bottom 8 can be seen.

It can further be seen that the two visible distance bars extend continuously from the proximal end 2 towards the distal end 3, ending with an offset towards the distal end 3. The surface of each elongated bar which faces towards the medial axis 13 function as a stop surface 11 for the inserted pipette tip 14; all stop surfaces together form a "common" stop surface in this case which define the position of the pipette tip 14 within the pipette tip extension 1. The distance elements 10 are not covered by the coating 27 here.

The pipette tip extension 1 in this embodiment is a single-piece body with respect to the exterior wall 4, the bottom 8, and the distance elements 10. The pipette tip extension further comprises a cover 28 which closes the reception aperture 7 and which in this case configured to be peelable of the pipette tip extension 1 for making the reception aperture 7 being accessible for a pipette tip 14. A cover 28 is particularly suitable to protect the coating 27 for example during storage.

In FIG. 2A an assembly comprising a pipette tip extension 1 with an inserted pipette tip 14 can be seen in a schematic side view. The pipette tip 14 shown is in a typical disposable pipette tip for handling liquids e.g. with a handheld pipette or a with a pipette 23 of an automated liquid handling workstation 20. Such a pipette tip 14 is an elongated tube having different cylindrical or conically tapering wall sections of a circumferential wall 15, which may be adapted to particular technical requirements of a pipette 23 and/or a pipetting head 21 to which the pipette tip 14 shall be attached for pipetting. The pipette tip 14 shown here comprises at a proximal a collar 16 with strengthening struts and at the distal end an outlet opening 17 for dispensing or aspirating a liquid (see also FIG. 7). The pipette tip 14 is attached to a pipette 23 with the proximal end, and the collar 16 prevents a deformation of the pipette tip 14 during the attachment, and provides a stabilizing effect.

In FIG. 2A, the pipette tip 14 is inserted with the outlet opening 17 ahead into a pipette tip extension 1 which essentially corresponds to the pipette tip extension shown in FIG. 1A. The distance elements 10 are configured here as elongated bars which form the fluid uptake area 12 adjacent to the inner side 6 of the exterior wall 4, and which additionally control the insertion depth of the pipette tip 14 in a way to ensure the formation of a gap g between the distal end of the pipette tip 14 and the bottom 8 of the pipette tip extension 1. The coating 27 is not visible in this view.

The gap g which is formed after the insertion of the pipette tip 14 can be seen in the sectional view of FIG. 2B. FIG. 2B is a schematic sectional drawing of the assembly of FIG. 2A along the intersection plane A-A, and in this Figure it becomes also apparent that the gap g at the bottom 8 of the pipette tip extension 1 in this embodiment provides a fluid connection between the interior of the disposable pipette tip 14 and the fluid uptake area 12 in the inner cavity 9 of the pipette tip extension 1. An analogous situation can also be seen in FIG. 7. As the fluid uptake area 12 is additionally in fluid connection with the surrounding atmosphere at the proximal end 2 of the pipette tip extension 1, it is ensured that a liquid 20 may be moved between the interior 18 of the pipette tip 14 and the fluid uptake area 12 of the pipette tip extension 1 when they are assembled to a functional unit. It is an advantage of the formation of the gap g that for example when a mixing step is carried out in the pipette tip extension 1, relatively high flow velocities may be achieved, thereby increasing the efficiency of the mixing. The configuration of the pipette tip extension 1 further ensures that the fluid flow is guided over the coating 27, so that the contact of a sample fluid with the coating 27 is ensured when the sample fluid is dispensed out of an inserted pipette tip 14.

Figure 3:
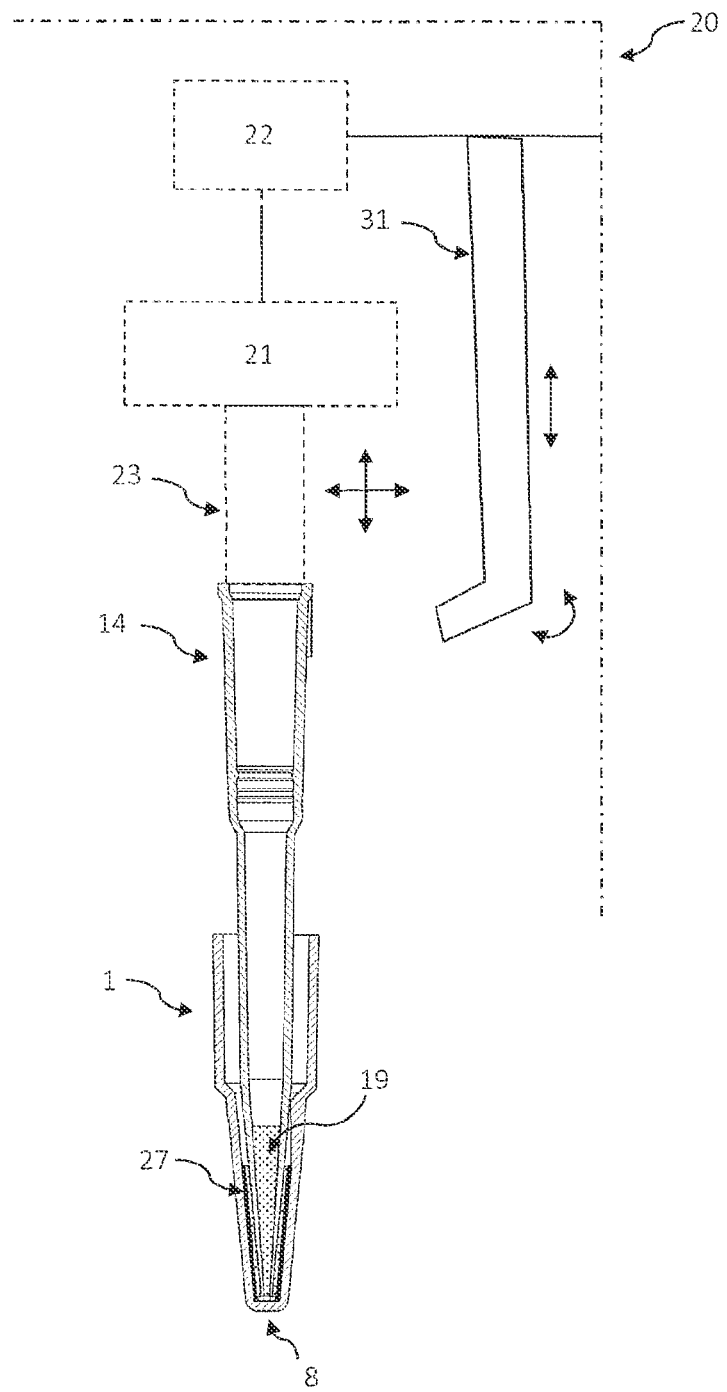

In FIG. 3, a pipette tip extension 1 is shown in a schematic overview during a liquid handling process of a liquid handling workstation 20. The liquid handling workstation 20 is configured to handle liquids 19 in an automated manner under the control of a controller 22. In particular, the controller 22 controls the activity for example of a pipetting head 21 for aspirating and dispensing liquids and moving liquids. In FIG. 3, the pipette tip extension 1 is shown in a schematic longitudinal section as being attached to disposable pipette tip 14 which in turn is attached to a pipette 23 of a pipetting head 21. A partial volume of a liquid 19 is present in the pipette tip 14, and another partial volume of the liquid 19 is present in the fluid uptake area 11 of the pipette tip extension 1, where it contacts the coating 27 for interaction. After insertion of a pipette tip 14, the pipette tip extension 1 is movable under the control of the liquid handling workstation 20. The possible movement directions are indicated by the arrows. The functional connection between the liquid handling workstation 20, the controller 22, and the pipetting head 12 are indicated by connection lines.

The liquid handling workstation 20 may additionally be configured to provide a mechanism of removing a pipette tip extension 1 from a pipette tip 14 to which it is attached. Such a mechanism may be for example an existing ejection mechanism 31 of a liquid handling workstation 20 used for removing a disposable tip 14 from a pipetting head 21, or may be a separate mechanism like a rake as discussed above.

Figure 4A:
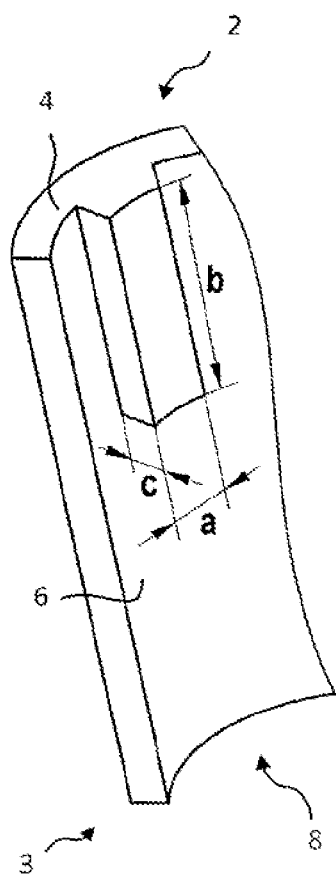

FIG. 4A shows in a schematic view onto the inner side 6 of the exterior wall 4 an exemplary embodiment of a distance element 10 which is configured as an elongated bar, and which is arranged flush with the proximal end of the exterior wall 4 of a pipette tip extension 1. A coating 27 is not indicated here for a better overview. The elongated bar extends from the proximal end 2 towards the distal end 3, and has a width "a" which corresponds to its dimension along the perimeter of the inner side 6 of the exterior wall 4, it has a length "b" which corresponds to its longitudinal dimension, and it has a depth "c" which corresponds to its dimension by which it protrudes into the inner cavity 7 and towards a medial axis 13. The description of depth a, length b, and width c may be applied to the distance elements 10 also in general.

Figure 4B:
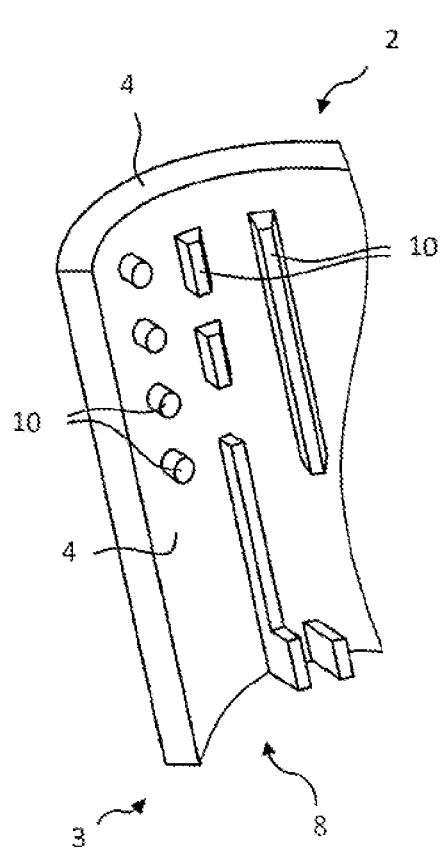

FIG. 4B shows schematically different configurations of a distance element 10. Also here, for reasons of clarity, a coating 27 is not shown. All distance elements 10 shown are arranged with an offset to the proximal end 2 of the peripheral wall 4. Shown are distance elements 10 which are configured as more or less elongated bars, or as cylindrical protrusions. It is possible to combine differently configured distance elements 10 to achieve a desired seat of a specific pipette tip 14 within the pipette tip extension 1. For example, a multitude of elongated bars may be arranged along the same line from the proximal end 2 towards the distal end 3. Such a distribution may particularly be advantageous for achieving a mixing effect within the pipette tip extension 1. Apart from simple elongated dimensions, also deviating forms such as snake- or nose-like extensions or other may be possible.

At the more distal section, additional constriction elements 24 for controlling the insertion depth of a pipette tip 14 are shown. On the left side, a distance bar is shown which comprises an additional protrusion towards the inner cavity 7 at its distal end. This additional protrusion sits on the side of the bottom 8 which faces towards the inner cavity 9. On the right side, a single constriction element 24 is shown, which is a simple protrusion directly from the inner side 6 of the exterior wall 4, and which may equally provide a stopper or stop surface that can be abutted from the distal end of a pipette tip 14.

The geometry of the inner gap which corresponds the fluid uptake area 31 may be adjusted by a respective adjustment of the number and geometry of the distance element(s) 10 used and also the geometry of the shape of the exterior wall 4, and, if desired, by the use of additional constriction elements 24. It might for example particularly desirable to minimize the width 29 of the fluid uptake area 12 when only smaller volumes of liquid 19 shall be used; in this case, special emphasis is needed for the geometry of the distance element(s) to minimize potential fluid trapping effects.

Figure 5A:
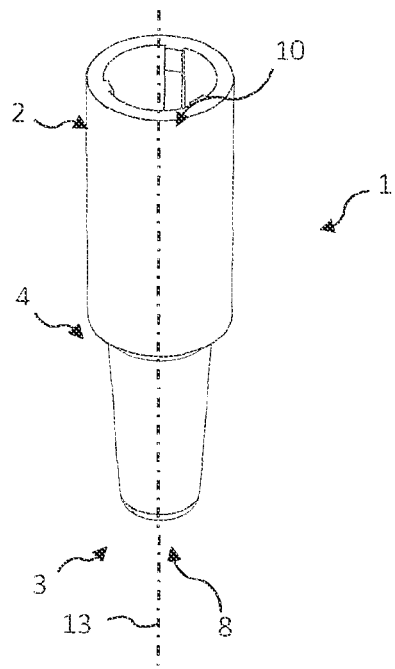

In FIG. 5A a schematic side view of a pipette tip extension 1 in a second embodiment concerning the configuration of the exterior wall 4, distance elements 10, and constriction elements 24 is shown. The coating 27 is not shown here due to clarity reasons. The pipette tip extension 1 comprises along the medial axis 13 two different sections, an upper section towards the proximal end 2, and a lower section towards the distal end 3. The upper section is longer than the lower section in this embodiment and is configured as an essentially cylindrical tube or as a tube only slightly tapering towards the lower section. The lower section is configured as a hollow tube with a higher degree of tapering towards the bottom 8. The lower section mouths into the bottom 8 at the distal end 3 of the pipette tip extension 1, which is more clearly visible in the FIGS. 5B and 5C. The upper section has a larger diameter than the lower section, so that a shoulder is formed at the transition from the upper section to the lower section. In this embodiment, the shoulder is formed both, on the outer side 5 and on the inner side 6 of the exterior wall 4.

The pipette tip extension 1 comprises at the upper section and on the inner side 6 of the exterior wall 4 three distance elements 10 which are configured as elongated bars. These elongated bars are flush with the proximal end 2 and extend continuously on the inner side 6 of the exterior wall 4 up to the shoulder at the transition to the lower section. The elongated bars protrude to a lesser extends into the inner cavity 9 at the immediate proximal end 2 of the pipette tip extension that close to the transition to the lower section. By this, the elongated bars, and specifically their surface which faces towards the medial axis 13, in the present context also referred to as stop surface 11, form in the inner cavity 9 a reception for a pipette tip 14, the reception tapering from the proximal end 2 of the pipette tip extension 1 towards the distal end 3. In this configuration, the pipette tip extension 1 is particularly useful for being attached to a pipette tip 14 which tapers in a complimentary way.

Figure 5B:
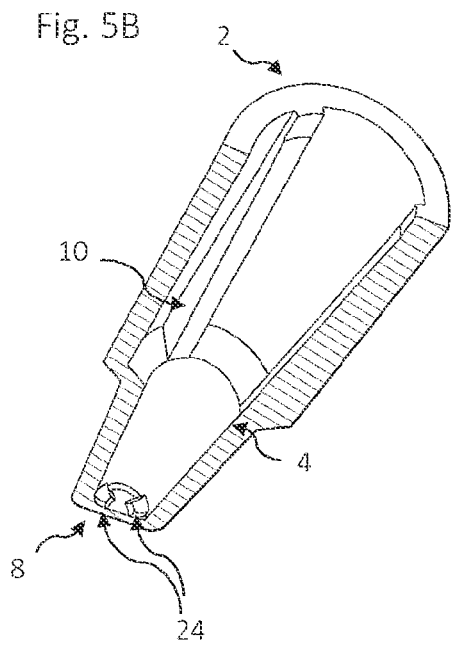

The configuration of the distance elements 10 as described for this second embodiment can be seen in more detail in FIG. 5B, which is a schematic and perspective longitudinal section of the pipette tip extension of FIG. 5A, thereby allowing a view into the inner cavity 9. By this it can be seen that at the transition from the upper section to the lower section, the elongated bars merge with the exterior wall 4 at the lower section. In any case, the inner side 6 of the pipette tip extension 1 is configured in such a way that if a pipette tip 14 is inserted into the pipette tip extension 1 of the FIGS. 5A to 5C, said pipette tip 14 essentially only abuts the elongated distance bars but not the inner surface 6 of the exterior wall 4 at the lower section. This is essential as it ensures that a fluid uptake area is formed at the inner side of the exterior wall 4 continuously from the bottom 8 up to the proximal end 2 of the pipette tip extension 1. Indeed, the configuration of the distance elements 10 define the positioning of a pipette tip 14 within the inner cavity 9 of the pipette tip extension 1, and ensure the formation of the fluid uptake area 12. The coating 27 may be applied on both, the inner side 6 of the lower section and the inner side of the upper section, and/or on the side surface of the elongated distance bars and/or the inner side at the bottom 8.

The pipette tip extension 1 shown comprises in addition to the distance elements 10 three constriction elements 24 which arranged at the bottom 8. These additional constriction elements 24 are configured here as separate spacing blocks which restrict at the bottom the insertion depth of a pipette tip 14 within the pipette tip extension 1. A pipette tip 14 inserted into the pipette tip extension 1 abuts the upper side of each of the spacing blocks. A direct contact of the distal end of the pipette tip 14 with the bottom 8 of the pipette tip extension 1 is prevented, and at the same time it is ensured that a fluid connection is established between the inner cavity of the inserted pipette tip 14 and the fluid uptake area 12 of the pipette tip extension 1 by the formation of the gap g.

Figure 5C:
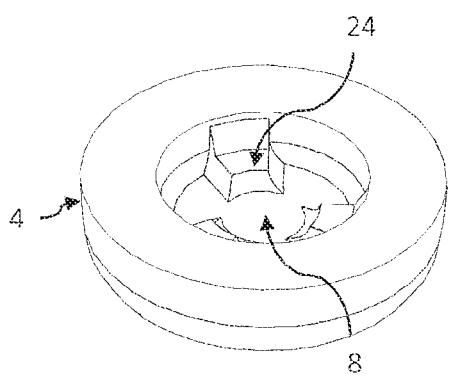

These additional spacing blocks are shown in more detail in FIG. 5C. It may be seen that in this embodiment the spacing blocks are positioned on the bottom 8 at the side which faces the inner cavity 9 and are connected with the inner side of the exterior wall 4. The connection with the exterior wall 4 is established by a beveled section of the spacing block. The degree of inclination of this beveled section may be used as a tool to precisely position a pipette tip 14 within the inner cavity 9, to ensure the establishment of a fluid uptake area 12 and the fluid connection between the fluid uptake area 12 and the inner cavity of the inserted pipette tip 14.

In FIG. 6A a schematic side view of a pipette tip extension 1 in a third embodiment concerning the configuration of the exterior wall 4, distance elements 10 and constriction elements 24 is shown. Also in this embodiment, the pipette tip extension 1 comprises along the medial axis 13 two different sections, an upper section towards the proximal end 2, and a lower section towards the distal end 3. The upper section has a larger diameter than the lower section, so that a shoulder is formed at the transition from the upper section to the lower section. Also in this embodiment, the shoulder is formed both, on the outer side 5 and on the inner side 6 of the exterior wall 4. Also similar is that the upper section is an essentially cylindrical tube or as a tube only slightly tapering towards the lower section, and the lower section being also configured as a hollow tube with a higher degree of tapering towards the bottom 8. The lower section mouths into the bottom 8 at the distal end 3 of the pipette tip extension 1.

However, in this third embodiment, the upper section is shorter than the lower section, and the distance elements 10 are arranged at the inner side 6 of the lower section. The inner cavity 9 surrounded by the upper section here rather serves to provide space for the fluid uptake area at the height of the upper section, and to provide the fluid connection with the surrounding atmosphere.

The configuration of the distance elements 10 in this third embodiment and the configuration of the constriction elements 24 for further restricting the insertion depth of a pipette tip 14 can be taken from the FIG. 6B and FIG. 6C. Also in this embodiment, three distance elements 10, configured as elongated bars, are used for establishing the fluid uptake area 12. Each of the three bars are formed by protrusions of the exterior wall 4, beginning flush with the shoulder formed between the upper and the lower section, and extending towards the bottom 8. The elongated bars are wedge-shaped and taper towards the distal end 3 of the pipette tip extension 1. The angle of inclination of the elongated bars may be adapted to the outer shape of the pipette tip 14 which shall be inserted, with the provision that the distance elements 10 space the pipette tip 14 apart from the inner side 6 of the exterior wall 4 to establish the fluid uptake area 12, even when a coating 27 is provided at the inner side 6 of the exterior wall 4, for example.

As may be seen in particular in FIG. 6C, the position of a pipette tip 14 within the inner cavity 9 is further controlled also in this embodiment by the use of additional constriction elements 24 at the bottom 8 of the pipette tip extension 1. In total, three constriction elements 24 are used, each being configured as a spacing block. In contrast to the embodiment shown in the FIGS. 5A to 5C, the spacing blocks are here not further connected to the exterior wall 4. In this configuration, the spacing blocks do not separate the fluid uptake area 12 at the bottom area, as it is for example the case in the embodiment shown in FIGS. 5A to 5C. This configuration may have the advantage to further increase a mixing effect due to the introduction of additional flow turbulences, but may additionally introduce a risk of an increased dead volume. A can be taken from the FIGS. 5A-5D and 6A-6D, the choice of numbers and configuration of a constriction element 24 may additionally have an effect onto the fluid flow in an assembly of a pipette tip extension 1 and a pipette tip 14.

Figure 7:
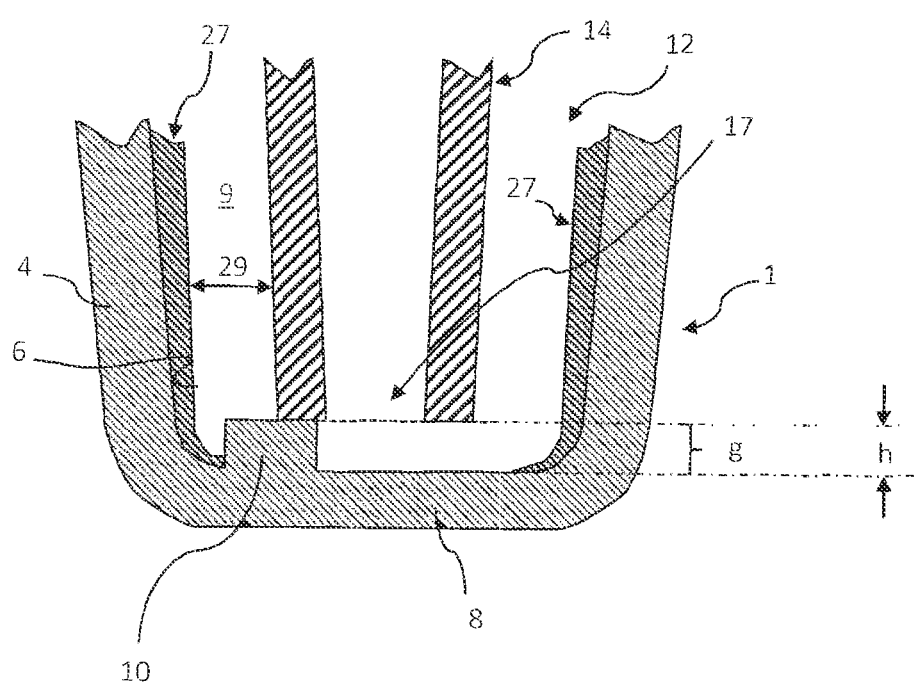

In FIG. 7, the configuration of the spacing blocks used on the bottom 8 of the third embodiment shown in FIG. 6C is shown in a more simplified schematic sectional view in higher magnification. Here, a pipette tip 14 is shown to be already inserted, abutting the upper surface of the one spacing block shown. The spacing block shown restricts the insertion depth of the pipette tip 14, and establishes a gap g between the distal end of the pipette tip 14 and the bottom 8 of the pipette tip extension 1. The gap g has a gap height h which in this case corresponds to the height of the spacing block along the longitudinal extension of the pipette tip extension 1 where the pipette tip 14 abuts the spacing block. The gap g formed at the bottom 8 of the pipette tip extension 1 allows a fluid being moved between the inner cavity of the inserted pipette tip 14 and the fluid uptake area 12 in the pipette tip extension 1. As the fluid uptake area 12 is not restricted towards the surrounding atmosphere at the proximal end 2 of the pipette tip extension 1, the fluid may be moved between pipette tip 14 and pipette tip extension 1 under the same conditions as for example for other standard aspiration or dispensing steps, while ensuring the contacting of the coating 27 with the fluid. By adapting the configuration of the one or more distance elements 10, the influence of the volume of the coating 27 onto the volume of the fluid uptake area 12 may additionally be controlled.

A particular advantage of a pipette tip extension 1 in one of the embodiments described herein or in an embodiment of a different combination of the single elements described or their equivalents is the possibility to simply put on the pipette tip extension 1 onto a pipette tip 14 and to move the pipette tip extension 1 with or without a liquid 19 by means of the pipette which holds the pipette tip 14. This is a particular advantage for example in the context of a liquid handling workstation 20, which is configured to move a pipette 23 in an automated manner. The pipette tip extension 1 here serves as a liquid handling vessel which may in a very simple way be transported on the liquid handling workstation 20 to the place where it is required, without the need of a user. For transporting the liquid handling vessel, only the existing robotic for moving the pipette is required; no further robotic is needed in this case.

Figure 8:
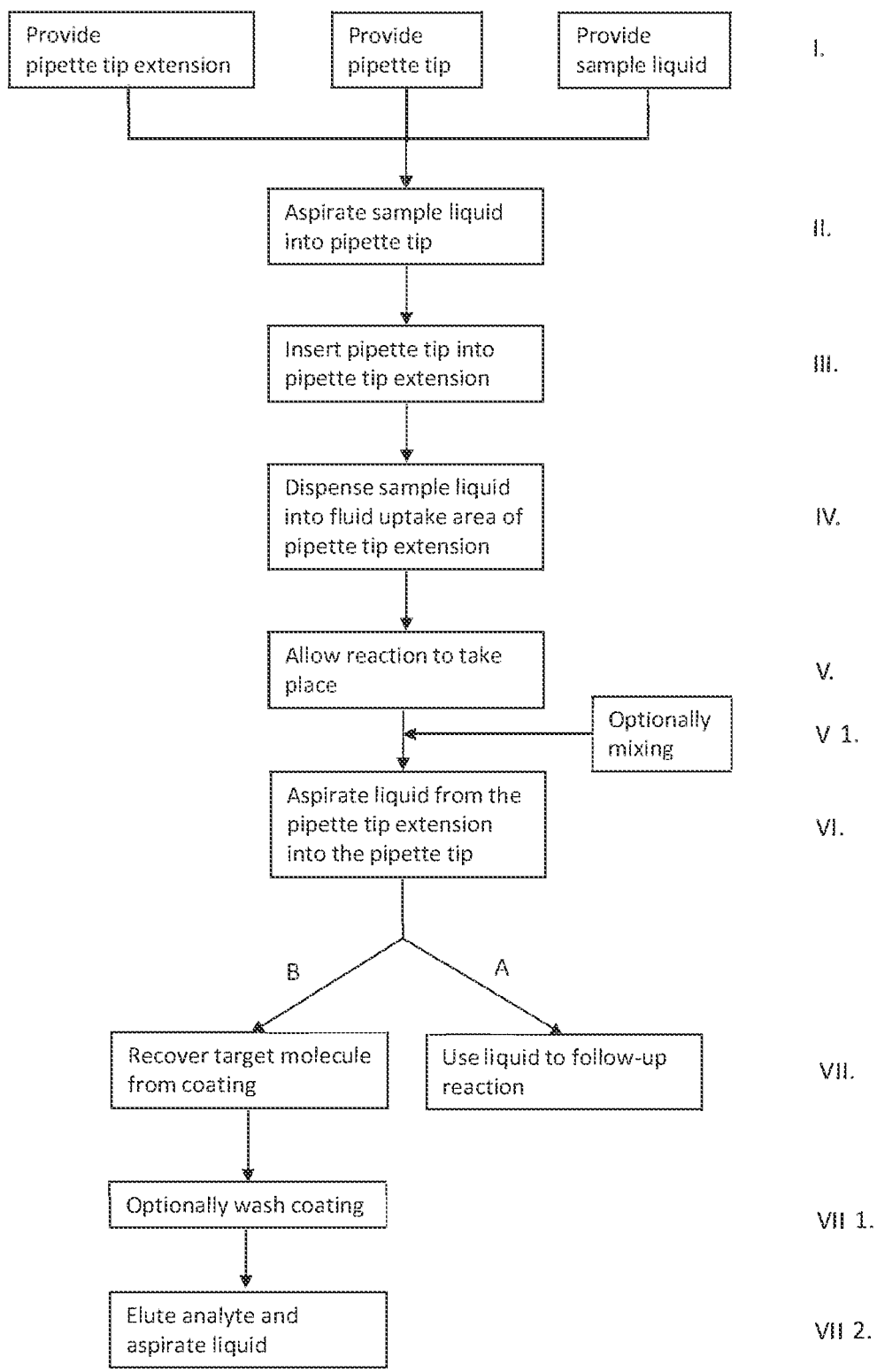

FIG. 8 is a schematic overview of a series of method steps in a particularly useful application of a pipette tip extension 1 comprising a coating 27 according to the invention. A pipette tip extension 1 comprising such a coating 27 is provided in step I. A coating 27 is in the present context a fully or at least partly immobilized layer or phase of material which is applied in this example on the inner side 6 of the exterior wall 4.

The coating 27 may however be in addition or alternatively be applied on the inner side of the bottom 8, and/or on the distance element(s) 10 on such surfaces which do not function as a stop surface 11. It may be desired to apply the coating on all reasonably available surfaces if for example the amount of material of the coating 27 shall be increased without substantially increasing the thickness of the coating 27.

Additionally provided in step I is a pipette tip 14 to which the pipette tip extension 1 is adapted, and a sample liquid. The liquid 19 may or may not comprise a target molecule.

In a next step II, the sample liquid 19 is aspirated into the pipette tip 14. Aspiration occurs by use of a pipette 23, which may be under the control of a controller 22 of a liquid handling workstation 20. The pipette tip extension 1 according to the invention is particularly suitable for being used in an automated liquid handling workstation 20, though it is also usable using a handheld pipette as described above.

The pipette tip 14 comprising the aspirated liquid 19 is then moved to the pipette tip extension 1 and in a further step III inserted therein. In case the pipette tip extension 1 is closed by a cover 28 for example to protect the coating 27 therein, the cover 28 may for example be removed manually peeling off, or the cover 28 may be pierced open upon insertion of the pipette tip 14.

As discussed before, the pipette tip extension 1 may be configured for example to have a pipette tip 14 inserted in a friction fit manner. In this embodiment, the pipette tip extension 1 can for example be moved by use of the inserted pipette tip 14 and the associated robotics of a liquid handling workstation 20. This is of an advantage, as the liquid handling workstation 20 does not require a separate robotic for transport the pipette tip extension 1. The pipette tip extension may however alternatively be configured to have a pipette tip 14 merely guided into a desired position without establishing a friction fit connection. In this case, the pipette tip extension 1 needs to be moved by a separate robotic of manually.

Upon insertion of the pipette tip 14, the fluid uptake area 12 is restricted in the inner cavity 9 of the pipette tip extension 1 in addition by the outer wall of the pipette tip 14. As the pipette tip extension 1 remains open at the proximal end 2, the sample liquid, which is in a next step IV dispensed into the fluid uptake area 12, is distributed in the inner cavity and brought in to direct contact with the coating 27. The liquid 19 may spread in a guided manner from the bottom 8 towards the proximal end, thereby contacting the coating 27, without the requirement of applying an additional driving force by the pipette 23 or the liquid handling workstation 20, as the fluid uptake area 12 is in fluid connection with the surrounding atmosphere at the proximal end 2. Settings however for example of the liquid handling workstation 20 may eventually require an adaptation in the case when the gap g and the width 29 of the fluid uptake area 12 are chosen so small that the liquid 19 must be forced through the gap g and fluid uptake area 12 by additional forces. Such a small width and gap may be desired if for example a high flow velocity shall be achieved.

Upon contacting the coating 27 by the sample liquid, the interaction reaction is allowed to take place, as indicated in step V. This may require an incubation step. As mentioned before, the interaction which takes place depends on the liquid 19 and on type of coating 27. In case the coating 27 is for example a lyophilized reagent, the interaction reaction is the solving of the reagent in the solvent solution. In case the pipette tip extension 1 is configured for example for carrying out an immunological detection of a target molecule, the interaction is for example an antibody-antigen-binding reaction, and in case the pipette tip extension 1 is configured to carry out an extraction step, the interaction is the binding between the sorbents and the target molecule. In the last two cases, the target molecule contacts the components of the coating 27 and is thereby also immobilized by the coating 27 in the pipette tip extension 1.

For improving the interaction reaction, one or more mixing steps V-1 may optionally be carried out. Mixing steps may advantageously be carried out by moving the liquid 19 between the pipette tip extension 1 and the inserted pipette tip 14 under the control of a liquid handling workstation 20 or a handheld pipette. Mixing may however also be achieved for example by repositioning the pipette tip extension with the liquid in the fluid uptake area 12 to a mixing device. Eventually, a heating step may be desired. In these cases, it may be desired to withdraw the pipette tip 14 from the pipette tip extension 1, and to re-insert the pipette tip 14 or insert a new pipette tip 14 after the mixing step, for example for moving the pipette tip extension 1 for later pipetting steps.

After a certain incubation time, the liquid 19 is aspirated in step VI from the pipette tip extension 1 into the pipette tip 14. The subsequent steps VII depend mainly on the configuration of the coating 27. The liquid 19 may be used immediately for follow-up reactions, for example if the coating 27 is a lyophilized reagent, which is resolved in the solvent solution in step V. In case the coating 27 is configured to bind an analyte or target molecule which is present in the liquid 19 and remains immobilized in the pipette tip extension 1, additional steps to recover the target molecule from the coating 27 are necessary.

These additional steps may optionally include a washing step VII-1. by using a washing solution. The washing solution is dispensed into the fluid uptake area 12 by a pipette tip 14 which is has been inserted into the pipette tip extension 1. The washing step VII-1 may include one or more additional mixing steps as described above to improve the contacting of the washing solution with the coating 27. The washing step VII-1. may be repeated one or more times. The number of repetition may depend on the nature of the liquid 19, of the analyte and/or of the respective coating 27.

Typically, after the washing, the analyte is resolved into a suitable solvent liquid by an elution step VII-2. For this, the washing solution is removed from the pipette tip extension 1 by aspirating the washing solution into the inserted pipette tip 14, and the washing solution is discarded with or without the pipette tip 14. An elution solution is then dispensed into the pipette tip extension 1 by means of a newly inserted pipette tip 14 which comprises said elution solution. Also the elution step VII-2 may optionally include one or more mixing steps as described above, to improve the separation from the analyte from the coating 27 and the uptake of the analyte into the elution solution. The elution solution with the analyte is then aspirated and may be further processed in follow-up reactions.

Figure 9:
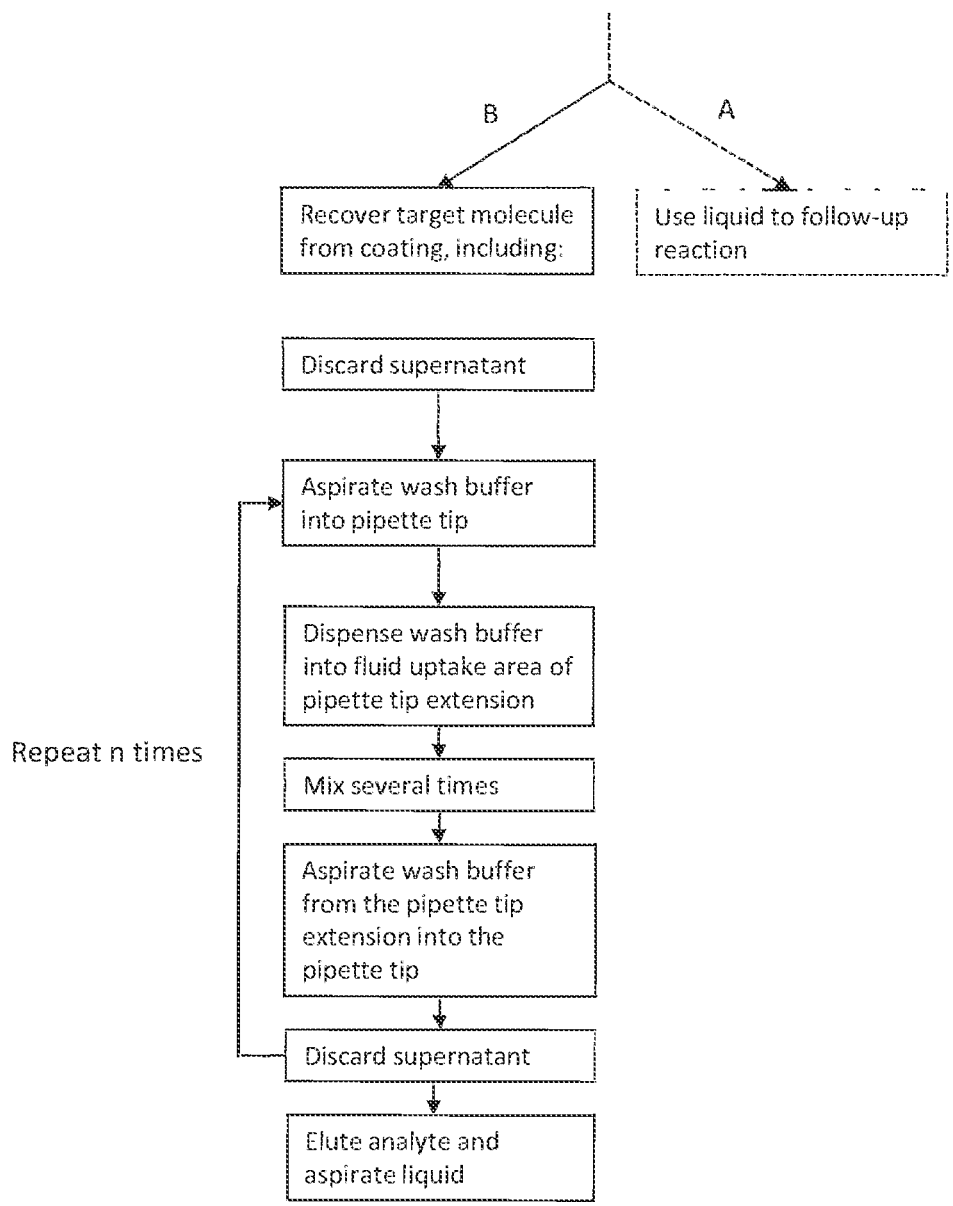

In FIG. 9, a schematic overview with more details of the washing step VII-1 for recovering a target molecule from the coating as described for step VII is shown. The supernatant which has been aspirated from the pipette tip extension 1 in step VI is discarded. A wash buffer may be aspirated into a new pipette tip 14, the tip is inserted into the pipette tip extension 1, and the wash buffer is dispensed from the pipette tip 14 into the pipette tip extension 1 and contacting the coating with the bound target molecule there. A mixing step may be carried out by consecutively moving the wash buffer between the pipette tip 14 and the pipette tip extension 1 by aspiration and dispense steps. The wash buffer is then aspirated from the pipette tip extension 1 into the pipette tip 14 and the supernatant is discarded in that the pipette tip 14 is removed from the pipette tip extension 1 and the wash buffer is dispensed for example into a waste container. The washing step may be repeated a number n of times, for example 3 to 5 times. Afterwards, the elution step according to step VII-2 is carried out.

| REFERENCE SIGNS LIST | |
|---|---|
| 1 | pipette tip extension |
| 2 | proximal end |
| 3 | distal end |
| 4 | exterior wall |
| 5 | outer side of 4 |
| 6 | inner side of 4 |
| 7 | reception aperture |
| 8 | bottom |
| 9 | inner cavity |
| 10 | distance element |
| 11 | stop surface |
| 12 | fluid uptake area |
| 13 | medial axis |
| 14 | pipette tip |
| 15 | wall of 14 |
| 16 | collar of 14 |
| 17 | outlet opening of 14 |
| 18 | interior wall of 14 |
| 19 | liquid |
| 20 | liquid handling workstation |
| 21 | pipetting head |
| 22 | controller |
| 23 | pipette |
| 24 | constriction element of 1 |
| 27 | coating |
| 28 | cover |
| 29 | width of fluid uptake area |
| 30 | pipette tip hosting area |
| 31 | ejection mechanism |
| 32 | height of coating |
| g | gap |
| h | gap height |

The invention claimed is:

1. A pipette tip extension attachable to a pipette tip, the pipette tip extension comprising:
   a proximal end, a distal end, and an exterior wall extending between the proximal end and the distal end, the exterior wall having an outer side and an inner side and forming at the proximal end a reception aperture for inserting a pipette tip,
   a bottom at the distal end,
   an inner cavity enclosed by the inner side of the exterior wall and the bottom,
   one or more distance elements arranged at the inner side of the exterior wall and protruding into the inner cavity, the distance elements being dimensioned to establish a fluid uptake area adjacent to the inner side of the exterior wall and the bottom, the fluid uptake area extending from the bottom up to the reception aperture and being in fluid connection with the surrounding atmosphere at the reception aperture, a constriction element configured to control an insertion depth of a pipette tip within the pipette tip extension, the constriction element defining a gap height between a distal end of an inserted pipette tip and the distal end of the pipette tip extension, and a coating facing towards said fluid uptake area.

2. The pipette tip extension according to claim 1, wherein the coating is applied on the inner side of the exterior wall and/or on a side of the bottom facing towards the inner cavity, and/or on the one or more distance elements.

3. The pipette tip extension according to claim 1, wherein the coating is selected from:
a sorption layer for an extraction of a target molecule,
a coating for a binding assay, or
a lyophilized or a dehydrated reagent.

4. The pipette tip extension according to claim 3, wherein the coating is a sorption layer for an extraction of a target molecule, and the coating is configured as:
a sorption layer for a liquid extraction,
a sorption layer for a solid phase extraction, or
a functionalized sorption layer.

5. The pipette tip extension according to claim 4, wherein the sorption layer is configured for the extraction of a target molecule from a sample, the target molecule being selected from a group comprising a protein, a peptide, a DNA molecule, an RNA molecule, a vitamin, a hormone, a drug, a medication substance, a metabolite, an allergen, a pesticide, a pollutant, an organic compound, an inorganic compound or molecule, a salt, a metal, and a metal ion.

6. The pipette tip extension according to claim 3, wherein the coating is configured as a coating for a binding assay, the coating comprising a biologically active substance, selected from a group comprising an antibody or an antigen.

7. The pipette tip extension according to claim 3, wherein the coating is a lyophilized reagent which is selected from a group comprising a nucleic acid, a protein, a peptide, a biological cell, a buffer or assay reagent, or a biological sample, or a combination thereof.

8. The pipette tip extension according to claim 1, wherein at least one of the distance elements comprises a stop surface which is directed towards a medial axis of the pipette tip extension, and which can be abutted by a pipette tip when the pipette tip extension is attached to the pipette tip.

9. The pipette tip extension according to claim 1, wherein at least one or each distance element is configured as an elongated bar which extends along a direction from the proximal end towards the distal end of the pipette tip extension.

10. The pipette tip extension according to claim 1, wherein the exterior wall has a shape which is adapted to an outer shape of a pipette tip to which the pipette tip extension shall be attached, the exterior wall being a circumferential wall which tapers towards the lower end of the pipette tip extension.

11. The pipette tip extension according to claim 1, wherein the constriction element is formed by:
a stop surface or a part thereof of the one or more distance elements which is directed towards a medial axis of the pipette tip extension, and/or
one or more spacing blocks arranged at the bottom in the inner cavity of the pipette tip extension.

12. An assembly comprising:
a pipette tip for aspirating and/or dispensing a liquid,
a pipette tip extension attached to the pipette tip, the pipette tip extension comprising:
a proximal end, a distal end, and an exterior wall extending between the proximal end and the distal end, the exterior wall having an outer side and an inner side and forming at the proximal end a reception aperture for inserting the pipette tip,
a bottom at the distal end,
an inner cavity enclosed by the inner side of the exterior wall and the bottom,
one or more distance elements for spacing apart the pipette tip from the attached pipette tip extension, the one or more distance elements being dimensioned to establish a fluid uptake area adjacent to the inner side of the exterior wall, the bottom and the inserted pipette tip, the fluid uptake area extending from the bottom up to the reception aperture and being in fluid connection with the surrounding atmosphere at the reception aperture,
a constriction element configured to control an insertion depth of a pipette tip within the pipette tip extension, the constriction element defining a gap height between a distal end of an inserted pipette tip and the distal end of the pipette tip extension, and
a coating for interacting with a fluid present in the fluid uptake area.

13. A method of treating a sample in a liquid, the method comprising the following steps:
providing a pipette tip extension according to claim 1, comprising a coating for interacting with a liquid present in the fluid uptake area,
aspirating a liquid into a pipette tip,
inserting the pipette tip filled with the liquid into the pipette tip extension,
dispensing the liquid into the fluid uptake area of the pipette tip extension, thereby contacting the liquid with the coating and allow the liquid to interact with the coating,
wherein the liquid is selected from a group comprising a liquid with or without an analyte or a biological sample.

14. The method of claim 13, comprising the step of moving the liquid one or multiple times between the pipette tip extension and the fluid uptake area of the pipette tip extension, thereby increasing the interaction between the liquid and the coating.

15. The method of claim 13, wherein the coating is a lyophilized reagent, and wherein the liquid is a solvent solution for the lyophilized reagent.

16. The method of claim 13, wherein the coating is a coating for a binding assay, the coating comprising an immobilized antibody or antigen, and wherein the liquid comprises a biological sample comprising a protein or peptide.

17. The method of claim 13, wherein the coating is a sorption layer for an extraction of a target molecule, and the liquid comprises the target molecule.

18. The method of claim 17, further comprising the steps of:
aspirating the liquid back into a pipette tip and discarding the liquid,
inserting a pipette tip comprising a wash solution into the pipette tip extension, and dispensing the wash solution into the fluid uptake area by using a pipette tip, and moving the liquid one or multiple times between the pipette tip extension and the fluid uptake area of the pipette tip extension.

19. The method of claim 17, further comprising the steps of:
aspirating the liquid back into a pipette tip and discarding the liquid,
inserting a pipette tip comprising an elution solution into the pipette tip extension, and dispensing the elution solution into the fluid uptake area by using a pipette tip, and
moving the liquid one or multiple times between the pipette tip and the fluid uptake area of the pipette tip extension.

20. The method of claim 13, wherein the pipette tip extension is moved by moving the pipette tip inserted into the pipette tip extension, using a handheld pipette or a pipette of a liquid handling workstation.

21. The method of claim 13, wherein each step of aspirating, dispensing or moving the liquid is controlled by a liquid handling workstation, the liquid handling workstation comprising a pipette to which the pipette tip is attached.

22. The method of claim 13, further comprising the step of removing the pipette tip extension from the pipette tip by using an ejection mechanism of a handheld pipette or of a liquid handling workstation.

\* \* \* \* \*